United States Patent
Tabata

(10) Patent No.: US 6,449,309 B1
(45) Date of Patent: *Sep. 10, 2002

(54) STEREOSCOPIC DISPLAY THAT CONTROLS BINOCULAR PARALLAX BETWEEN TWO IMAGES AND CONTROLS IMAGE RECONSTITUTION ACCORDING TO PARALLAX DATA

(75) Inventor: Seiichiro Tabata, Hino (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/816,175

(22) Filed: Mar. 12, 1997

(30) Foreign Application Priority Data

Mar. 12, 1996 (JP) .............................. 8-083380

(51) Int. Cl.[7] .............................. H04N 7/12; H04N 7/18
(52) U.S. Cl. ..................... 375/240.01; 348/53
(58) Field of Search .................... 348/42, 43, 46, 348/51, 53, 54, 55; 349/15, 1, 5; 359/462, 464, 466, 476; 375/240.01; H04N 7/18, 7/12

(56) References Cited

U.S. PATENT DOCUMENTS

| 5,193,000 A | * | 3/1993 | Lipton | 348/43 |
|---|---|---|---|---|
| 5,703,637 A | * | 12/1997 | Miyazaki | 348/53 |
| 5,737,012 A | * | 4/1998 | Tabata | 348/53 |
| 5,764,317 A | * | 6/1998 | Sadovnik et al. | 349/5 |
| 5,771,066 A | * | 6/1998 | Barnea | 348/55 |
| 5,801,760 A | * | 9/1998 | Uomori | 348/51 |
| 5,812,186 A | * | 9/1998 | Telfer et al. | 348/54 |
| 5,825,456 A | * | 10/1998 | Tabata | 348/51 |

FOREIGN PATENT DOCUMENTS

| JP | HEI 3-292093 | 12/1991 |
|---|---|---|
| JP | HEI 6-85590 | 10/1994 |
| JP | Hei 7-167633 | 7/1995 |
| JP | Hei 9-224267 | 8/1997 |

OTHER PUBLICATIONS

O Plus E, Physiological Optics 15, Dec. 1985.

* cited by examiner

Primary Examiner—Richard Lee
(74) Attorney, Agent, or Firm—Pillsbury Winthrop LLP

(57) ABSTRACT

A signal representing an eyeball accommodation detected by an eyeball accommodation detector 18 provided for the left eye 10L is supplied to a shift amount calculator 34. The shift amount calculator 34 calculates necessary shift amounts of a right eye and left eye image corresponding to the eyeball accommodation, and supplies signals representing the necessary shift amounts to image shifters 32R and 32L. According to these signals, the image shifters 32R and 32L horizontally shift a right eye and a left eye image signal from an image generator 31 on a right eye and as left eye LCDs 11R and 11L, respectively, to obtain an adequate binocular parallax.

5 Claims, 25 Drawing Sheets

FIG. 4
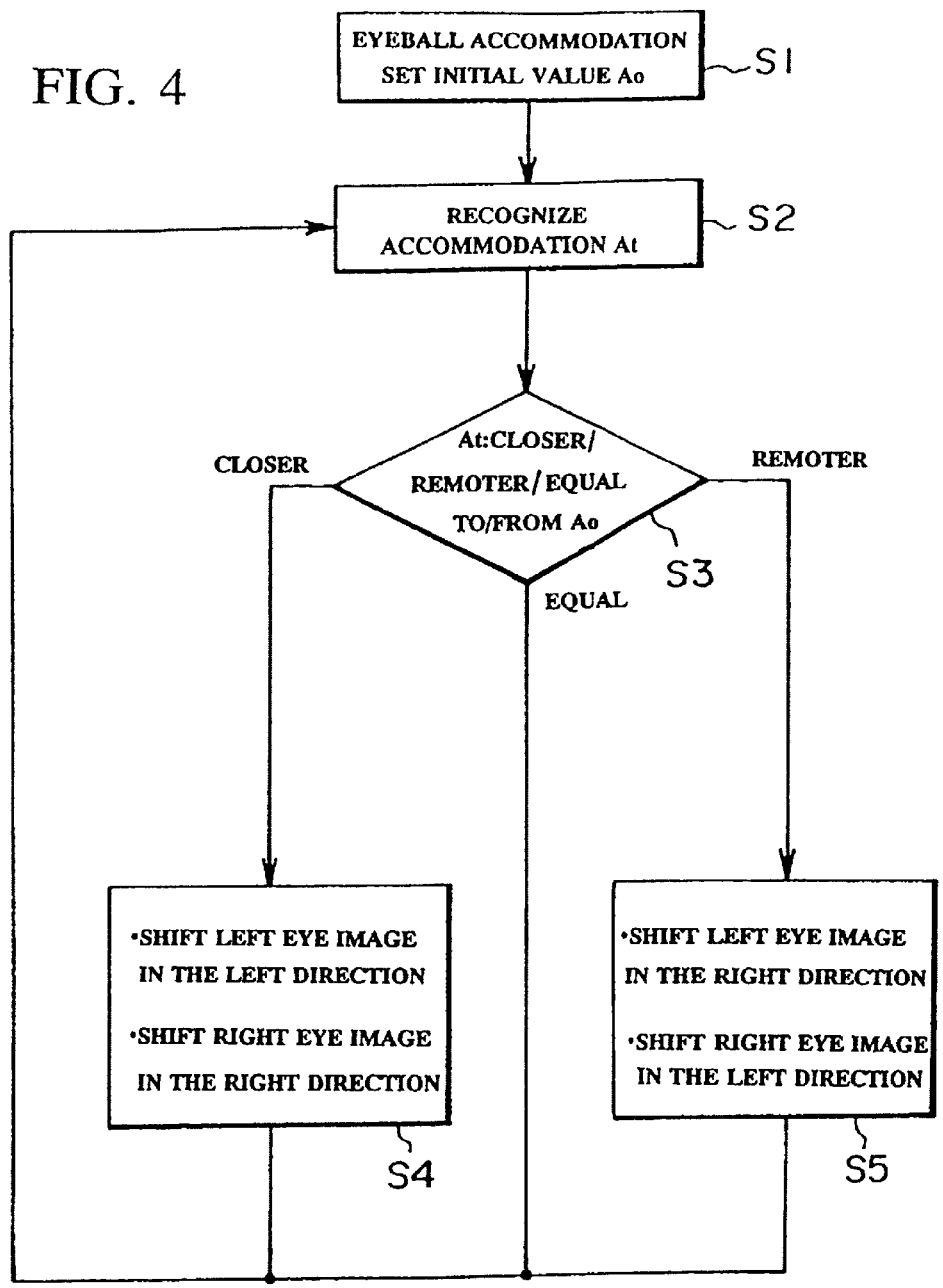
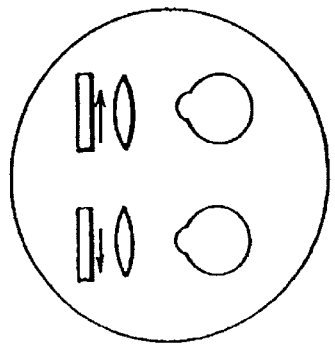
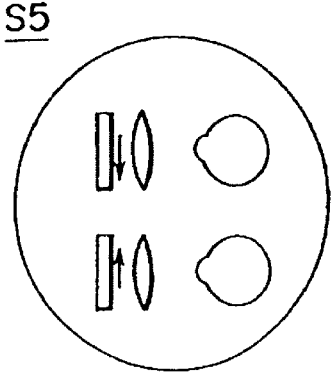

S5: DETECTED VERGENCE ANGLE > DESIRED VERGENCE ANGLE
SHIFT CLOSER

LEFT   RIGHT

S4: DETECTED VERGENCE ANGLE > DESIRED VERGENCE ANGLE
SHIFT REMOTER

LEFT   RIGHT

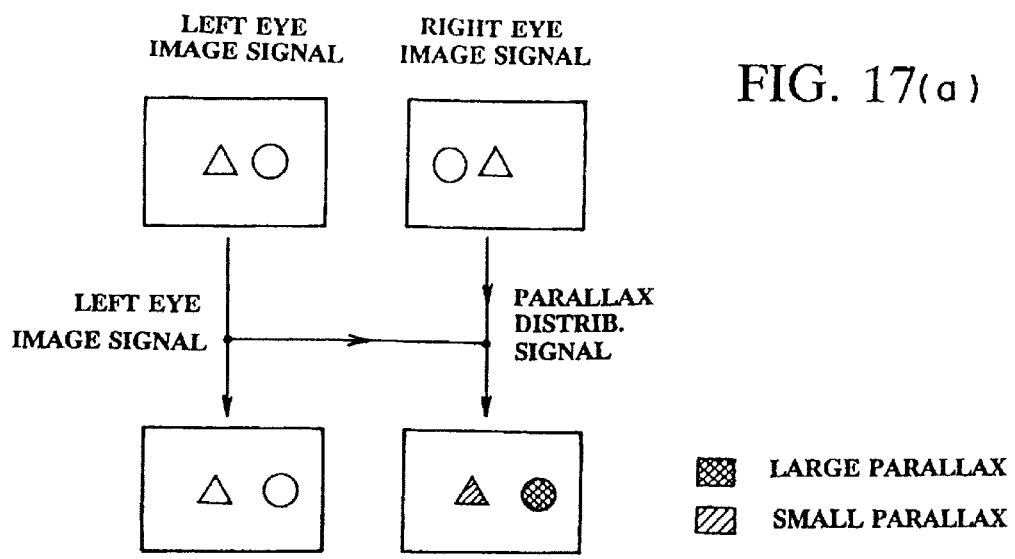
FIG. 17(a)
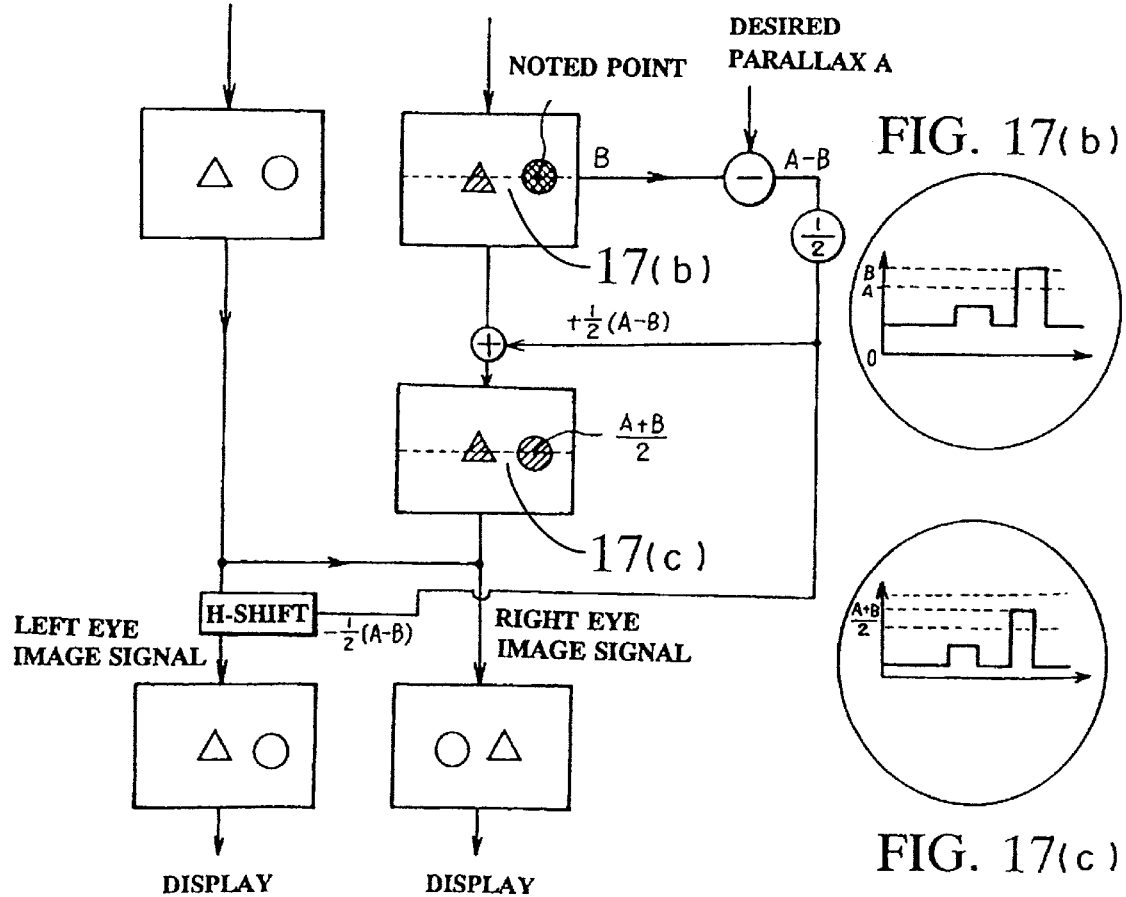
FIG. 17(b)
FIG. 17(c)

STEREOSCOPIC DISPLAY THAT CONTROLS BINOCULAR PARALLAX BETWEEN TWO IMAGES AND CONTROLS IMAGE RECONSTITUTION ACCORDING TO PARALLAX DATA

BACKGROUND OF THE INVENTION

1. Field of the Invention

The present invention relates to a stereo image display apparatus (i.e. three dimensional image display apparatus) which can display a stereo image to the viewer with left eye and right eye images with a binocular parallax and, more particularly, to improvements in the stereo image display apparatus for alleviating the departure from the natural sense of viewing and fatigue of the viewer.

2. Discussion of Related Art

As visual display apparatuses or systems, various stereo image display apparatuses for displaying images viewed as stereo images have been proposed.

FIG. 18 is a perspective view showing a head-mounted display (HMD) 700 as an example of such stereo video display apparatus. The illustrated HMD 700 is a binocular stereo display. The HMD 700 has a frame 702, which is mounted on the viewer's head and supports left and right display elements and also left and right enlarging optical systems 701 in front of the viewer's left and right eyes. Thus, a left eye image is displayed to the left eye, while a right eye image is displayed to the right eye, whereby the viewer can view the images as stereo image. The frame 702 has a sensor support 703 supporting a head motion sensor 704, which is located on the head to and detects motion of the head. Thus, the viewer can view the image in correspondence to the motion of his or her head. A data processor 720 is connected via a cable 722 to a connector 706, which is supported on a connector support 705 provided on the frame 702. A loudspeaker 709 for outputting sound is provided around the ear. The data processor 720 has operating buttons 720a which are operable by the user for various operations. With the above stereo image display apparatus such as the HMD, the viewing distance and the vergence distance fail to coincide with each other, resulting in a departure from the natural sense of viewing.

FIGS. 19(a) to 19(c) are views for describing how left eye and right eye images are viewed as a stereo image in the stereo image display apparatus. These figures show an example of a stereo image viewed by the left and right eyes. The image includes two objects, i.e., a sphere and a triangular pyramid, the sphere approaching the viewer. In this case, the left eye image and right eye image are changed from those shown in FIG. 19(a) to those shown in FIG. 19(b) and then to those shown in FIG. 19(c). As shown, the sphere is moved toward the center while being gradually increased in size. This means that the binocular parallax is gradually increased.

FIG. 20 shows the way in which the images shown in FIGS. 19(a) to 19(c) are viewed with the two eyes. Increasing binocular parallax leads to verging (or merging, i.e. reaching or going to each a viewer's state of perceiving one image on the basis of a plurality of images), so that the viewer's eyeballs are turned inward. This rotation of the eyes is called vergence and is defined as the vergence angle. In this specification, the distance between the optical axes of the eyeballs in vergence and each eye is called parallax distance. In the HMD, the parallax distance is equal to the distance between the point of intersection of the main beams of the left and right images and the main plane of the eyepiece optical system. The parallax of eyeballs immediately induces accommodation. With increasing parallax angle, the accommodation tends to be closer. Conversely, with reducing parallax angle, the accommodation tends to be further apart. In the stereo image display, the plane in which the image can be viewed with the best contrast is fixed. (In this specification, the distance form this plane to each eyeball is called viewing distance.) In this connection, inconsistency has heretofore taken place. Specifically, the above phenomenon occurs not only in the HMD but also in various stereo television sets, such as those of shutter switching system, lenticular system, etc. In these systems, the viewing distance of stereo television is the distance from the display surface of the display, such as a CRT, to each eye of the viewer.

Viewing image of great vergence distance changes as the stereo image in a state that the viewing distance and the vergence distance do not coincide, leads to a problem that the viewing is unnatural. This problem may be avoided by producing an image with less fly-out changes. By so doing, however, the impact of the image as a stereo image is weakened.

To solve this problem, Japanese Patent Publication Heisei 6-85590 proposes an HMD, in which the viewing distance is varied according to the image motion through mechanical driving of the eyepiece lens. Japanese Laid-Open Patent Publication Heisei 3-292093 discloses a method of varying the viewing degree by detecting a point viewed by the viewer and moving lenses according to the depth information at the viewed point. These systems permit the viewing degree and the vergence angle to be coincident.

Japanese Laid-Open Patent Publication Heisei 7-167633 shows a method of controlling the optimum viewing point, which permits the viewer to perceive the depth world of an object in the broadest range, by calculating the point from the binocular parallax of the image, such that the point is reproduced on the surface of a stereo image display unit or at a specified distance from the surface. As a specific means, a parallax map is calculated from the left and right images by using a correlation matching map, and then the mean parallax of the entire image or a weighted mean of image center data is calculated. Using this mean average, a parallax controller controls the horizontal read timing of the left and right images. This method does not require any mechanical drive system, and it is thus possible to prevent size increase.

FIGS. 21(a) to 21(c) are views showing left eye and right eye images displayed in a stereo image display apparatus, which was proposed earlier by the inventor (Japanese Patent Application Heisei 8-28856). Like the case of FIGS. 19(a) to 19(c), two objects, i.e., a sphere and a triangular pyramid, are displayed, the sphere becoming closer. In this case, the left eye and right eye images are changed from those shown in FIG. 21(a) to those shown in FIG. 21(b) and then to those shown in FIG. 21(c). In this apparatus, the parallax of the left eye and right eye images is substantially fixed irrespective of the motion of the sphere as an object toward and away from the viewer.

FIG. 22 shows the three-dimensional space made by an HMD when the images of FIGS. 21(a) to 21(c) are displayed on the HMD. In this case, the vergence distance L with respect to the sphere is unchanged although the image of the ball is increased as the ball becomes closer. The triangular pyramid, on the other hand, is moved apart from the viewer although its size is unchanged. In other words, the distance difference between the triangular pyramid and the sphere is increased as in the prior art case. Nevertheless, the vergence distance L with respect to the sphere is substantially fixed.

This is owing to the fact that the human's eyes is not so sensitive with respect to the detection of the absolute distance although they are sensitive to changes in the relative distance. Experiments conducted by the inventor prove that the viewer viewing a stereo image of only a single object with changing binocular parallax (background being black), cannot perceive distance changes. However, the sense of stereo arises when objects in different motions are displayed simultaneously. This means that it is difficult to recognize a distance change of a single object, although distance changes between two objects can be recognized. According to the proposal noted above, with the distance difference between the sphere and the triangular pyramid changing as usual and also the sphere changing in size while the triangular pyramid is not, the viewer perceive as though the sphere is becoming closer while the triangular pyramid is changing the position thereof. Preferably, the vergence distance L of the sphere in FIG. 22 is made coincident with the viewing distance. More preferably, an eye detector judges whether the viewer is viewing the sphere or the triangular pyramid, and the vergence distance of the image being viewed is made substantially constant.

FIG. 23 is a view for explaining the status of merging of a stereo image, which is actually displayed on a left and a right display surface. The relation between the binocular parallax and the vergence distance L when viewing the stereo image is now considered. Whit reference to the figure, when the merging is attained, the horizontal positions $X_1$ and $X_2$ of the sphere on the left and right display surfaces when the sphere is viewed to be at a vergence distance L and on a horizontal position $-H$, are respectively given as equations (1) and (2).

$$X_1 = (d + (-H)/L \cdot 1/\tan \theta) \quad (1)$$

$$X_2 = (-d + (-H)/L \cdot 1/\tan \theta) \quad (2)$$

In these equations, d is the distance from the mid point between a left and a right lens to each lens (the distance being positive for the right eye and negative for the left eye), and $\theta$ is the half field angle. The horizontal positions are prescribed as follows.

FIG. 24 is a view showing how the horizontal positions $X_1$ and $X_2$ in FIG. 23 are prescribed. As shown in FIG. 24, the prescription is made by setting the horizontal center value of the display region to "0" and the horizontal length of the display region to "2". Equation (1) can be derived from the fact that the triangle with points A to C in FIG. 23 as the apices and the triangle with origin 0 and points $X_1$ and C on the left display surfaces as the apices are similar to each other. Likewise, equation (2) can be derived from the similarity of the triangle with points D, B and E as the apices and the triangle with the origin 0 and points $X_2$ and E on the right display surface to each other.

Equations (1) and (2) can be rearranged into equation (3).

$$X_1 - X_2 = (2D/L) \cdot 1/\tan \theta \quad (3)$$

In equation (3), the left side $(x_1 - x_2)$ represents the parallax. Equation (3) shows that the vergence distance L when the merging is attained is independent on the horizontal position H but is determined when the parallax is determined.

The permissible change in the vergence distance L, i.e., the permissible change in the parallax, will now be considered. FIG. 25 is a view showing the correspondence relation between accommodation (i.e., state of focus of the eyes) and vergence. The figure shows the permissible range of the vergence-accommodation and the parallax ("O Plus E", Physiological Optic 15, December 1985, pp. 103). In the graph, the ordinate is taken for the accommodation (parallax)) (D: diopter), and the abscissa is taken for the vergence (vergence angle: MW). It will be seen from the graph that the vergence is obtainable in a short period of time so long as its changes are within 4 diopters.

In the prior art techniques or the earlier system proposed by the inventor as described above, the binocular parallax which is based on the left eye and right eye images, is not controlled in direct dependence on the instantaneous accommodation (i.e., state of focus of the viewer's eyes) or vergence. Therefore, sufficient design for alleviating the departure of the natural sense of viewing or fatigue of the viewer may be relatively difficult.

With the construction of the system shown in the Japanese Laid-Open Patent Publication Heisei 7-167633 which, for permitting the viewer to perceive the depth world of an object in the broadest range, controls the optimum viewing point by calculating the point from the binocular parallax of image, specifically calculating a parallax map from the left and right images by using a correlation matching map and then calculating the mean parallax of the entire image or a weighted mean as the product of image center data and a weight, so that the point would be reproduced on a stereo image display surface or at a specified distance therefrom, such problems are posed as a cost increase due to the necessity of a plurality of frame memories and transmission capacity increase for transmitting left and right image signals and parallax map signal.

SUMMARY OF THE INVENTION

In view of the above problems inherent in the prior art, the present invention has an object of providing a stereo image display apparatus of the type as shown above, which permits binocular parallax control sufficiently reflecting the instantaneous accommodation or vergence of the viewer's eyes and further reduction of the calculation time, cost and data transmission capacity.

According to the present invention, a stereo image display apparatus of the type as shown above can be realized, which permits binocular parallax control sufficiently reflecting the state of the instantaneous accommodation or vergence, as well as permitting further reduction of the calculation time, cost and data transmission capacity.

The constructions according to the present invention, problems which can be solved by these constructions and advantages obtainable according to the present invention, in various aspects contained in the specification, are summarized as follows.

According to a first aspect of the present invention, there is provided a stereo image display apparatus comprising: display means capable of displaying left eye and right eye images with binocular parallax in predetermined display regions; eyeball accommodation detecting means for detecting a viewer's eyeball accommodation; and binocular parallax control means for effectively controlling the binocular parallax according to the eyeball accommodation detected by the eyeball accommodation detecting means with utilizing some way bringing about a resultant change in the binocular parallax.

In the prior art, the optimum viewing point which permits the viewer to sense the depth world of an object in the broadest range is calculated from the binocular parallax of image, and a control is made such that the optimum viewing point is reproduced on the surface of a stereo image display or at a designated distance from-that surface. However, the calculation of the optimum viewing point is time-consuming, and it has been difficult to make quick parallax control.

The first aspect of the present invention provides a stereo image display apparatus, which is simple in construction and excellent in response. According to the first aspect of the present invention, the viewer's eyeball accommodation is detected, and the binocular parallax is matched to the detected value, thus permitting realization of a stereo image display apparatus which is simple in construction and excellent in response.

According to a second aspect of the present invention, there is provided the stereo image display apparatus according to the first aspect, wherein the binocular parallax control means controls the binocular parallax by changing the horizontal display positions of the left eye and right eye images in the predetermined display regions.

According to the second aspect of the present invention, in addition to the advantages obtainable according to the first aspect of the present invention, it is possible to realize an apparatus, which is free from mechanical drive, small in size and light in weight.

According to a third aspect of the present invention, there is provided the stereo image display apparatus according to the first aspect, wherein the binocular parallax control means compares a predetermined desired eyeball accommodation and the eyeball accommodation detected by the eyeball accommodation detecting means, controls the binocular parallax to be lower when the detected accommodation corresponds to a point close to the point of the desired accommodation, and controls the binocular parallax to be higher when the detected accommodation is remoter than the desired accommodation.

According to the third aspect of the present invention, in addition to the advantages obtainable according to the first aspect of the present invention, a specific method of the binocular parallax control is provided.

According to a fourth aspect of the present invention, there is provided the stereo image display apparatus according to the first aspect, wherein the binocular parallax control means controls the binocular parallax according to pertinent data held in necessary change data holding means holding data representing various correspondence relations between the result of comparison between the predetermined desired eyeball accommodation and the eyeball accommodation detected by the eyeball accommodation detecting means and a corresponding necessary change in the horizontal distance between the display positions of the left eye and right eye images displayed by the display means.

According to the fourth aspect of the present invention, in addition to the advantages obtainable according to the first aspect of the present invention, adequate binocular parallax control can be quickly made according to pertinent data held in necessary change data holding means such as a ROM.

According to a fifth aspect of the present invention, there is provided the stereo image display apparatus according to the first aspect, wherein the binocular parallax control means controls the binocular parallax to make zero the result of comparison of the predetermined desired eyeball accommodation and the eyeball accommodation detected by the eyeball accommodation detecting means.

According to the fifth aspect of the present invention, in addition to the advantages obtainable according to the first aspect of the present invention, feedback control or like control is made to make zero the difference between a desired eyeball accommodation and an eyeball accommodation detected by eyeball accommodation detecting means as a comparison result, and it is thus possible to obtain adequate binocular parallax control following circumstance changes.

According to a sixth aspect of the present invention, there is provided a stereo image display apparatus comprising: display means capable of displaying left eye and right eye images with binocular parallax in predetermined display regions; eyeball vergence angle detecting means for detecting the viewer's eyeball vergence angle; desired vergence angle setting means for setting a desired vergence angle concerning images displayed on the display means; and horizontal display control means for controlling the horizontal display positions of a left eye and a right eye image in the predetermined display regions of the display means by shifting the horizontal display positions in opposite directions by an equal absolute amount according to the difference between the desired eyeball vergence angle set by the desired vergence angle setting means and the eyeball vergence angle detected by the eyeball vergence angle setting means.

According to the sixth aspect of the present invention, in the binocular parallax control the horizontal display positions of left eye and right eye images are shifted in opposite directions by an equal absolute amount, so that the horizontal positions of images viewed as stereo image are not undesirably changed.

According to a seventh aspect of the present invention, there is provided the stereo image display apparatus according to the sixth aspect, wherein the binocular parallax control means controls the binocular parallax according to pertinent data held in necessary change data holding means holding data representing various correspondence relations between the result of comparison between the predetermined desired eyeball accommodation and the eyeball accommodation detected by the eyeball accommodation detecting means and a corresponding necessary change in the horizontal distance between the display positions of the left eye and right eye image displayed by the display means.

According to the seventh aspect of the present invention, in addition to the advantages obtainable according to the sixth aspect of the present invention, adequate binocular parallax control can be quickly made according to pertinent data held in necessary change data holding means such as a ROM.

According to an eighth aspect of the present invention, there is provided the stereo image display apparatus according to the sixth aspect, wherein the binocular parallax control means effectively controls a deviation to make zero, where the deviation is the result of comparison of the predetermined desired eyeball accommodation and the eyeball accommodation detected by the eyeball accommodation detecting means.

According to the eighth aspect of the present invention, in addition to the advantages obtainable according to the sixth aspect of the present invention, a feedback control or like control is made to make zero the difference between a desired eyeball accommodation and an eyeball accommodation detected by eyeball accommodation detecting means as a comparison result, and adequate binocular parallax control thus can be quickly obtained following circumstance changes.

According to a ninth aspect of the present invention, there is provided the stereo image display apparatus according to the sixth aspect, wherein the desired vergence angle setting means includes data holding means which holds, as data representing the desired eyeball vergence angle, the value of an eyeball vergence angle obtained in connection with the display of left eye and right eye images having parallax corresponding to the distance from a virtual image position to the eyeball.

According to the ninth aspect of the present invention, in addition to the advantages obtainable according to the sixth aspect of the present invention, it is possible to realize an apparatus, which permits image viewing with less departure from the viewer's natural sense of viewing and less fatigue of the eyes and serves of the viewer.

According to a tenth aspect of the present invention, there is provided the stereo image display apparatus according to the sixth aspect, wherein the desired vergence angle setting means which holds, as data representing the desired vergence angle, a measurement of the viewer's eyeball vergence angle with respect to a reference stereo image set at a predetermined distance from the viewer.

According to the tenth aspect of the present invention, in addition to the advantages obtainable according to the sixth aspect of the present invention, it is possible to obtain binocular parallax control matched to the viewer's actual eyeball vergence angle.

According to an eleventh aspect of the present invention, there is provided the stereo image display apparatus according to the sixth aspect, wherein the eyeball vergence angle detecting means includes a left eye image pick-up means for obtaining a left eye image, a right image pick-up means for obtaining a right eye image, and correlating means for obtaining a correlation between the left eye and right eye images.

According to the eleventh aspect of the present invention, in addition to the advantages obtainable according to the sixth aspect of the present invention, a specific method of realizing vergence angle detecting means is provided.

According to a twelfth aspect of the present invention, there is provided a stereo image display apparatus comprising: parallax distribution data generating means for generating parallax distribution data representing a parallax distribution status viewed in relation to a right eye (or left eye) image of left eye and right eye images having a binocular parallax at each predetermined position in the left eye (or right eye) display region; transmitting means for transmitting for transmitting left eye (or right eye) image data representing a left eye (or right eye) image and the parallax distribution data; receiving means for receiving the left eye (or right eye) image data and the parallax distribution data transmitted by the transmitting means; desired parallax data holding means for holding predetermined desired parallax data; parallax difference data deriving means for extracting data representing a parallax in particular coordinates among the parallax distribution data and deriving data representing the difference between the extracted parallax data and the desired parallax data held in the desired parallax data holding means; parallax distribution data correcting means for correcting the entire parallax distribution data by an equal amount according to the difference data from the parallax difference data deriving means; and image data generating means capable of generating right eye (or left eye) corrected image data representing the right eye (or left eye) image according to the left eye (or right eye) image data received by the receiving means and the corrected parallax distribution data from the parallax distribution data correcting means, and supplying the received left eye (or right eye) image data and the left eye (or right eye) corrected image data to predetermined display means.

According to the twelfth aspect of the present invention, the data amount concerning the transmission of stereo image data can be greatly reduced, and right eye (or left eye) corrected image data reconstructed in the receiving side system permits obtaining reconstructed images with controlled binocular parallax without having resort to separate horizontal display position shift means. It is thus possible to simplify the construction of the apparatus.

According to a thirteenth aspect of the present invention, there is provided a stereo image display apparatus comprising: parallax distribution data generating means for generating parallax distribution data representing a parallax distribution status viewed in relation to a right eye (or left eye) image of left eye and right eye images having a binocular parallax at each predetermined position in the left eye (or right eye) display region; transmitting means for transmitting for transmitting left eye (or right eye) image data representing a left eye (or right eye) image and the parallax distribution data; receiving means for receiving the left eye (or right eye) image data and the parallax distribution data transmitted by the transmitting means; desired parallax data holding means for holding predetermined desired parallax data; parallax difference data deriving means for extracting data representing a parallax in particular coordinates among the parallax distribution data and deriving data representing the difference between the extracted parallax data and the desired parallax data held in the desired parallax data holding means; parallax distribution data correcting means for correcting the entire parallax distribution data by an equal amount according to the difference data from the parallax difference data deriving means; and corrected image data generating means capable of processing the left eye (or right eye) image data received by the receiving means according to the corrected parallax distribution data from the parallax distribution data correcting means, thereby generating left eye (or right eye) corrected image data corresponding to a result of motion of the left eye (or right eye) image in a first sense of the horizontal direction and right eye (or left eye) corrected image data corresponding to a result of motion of the right eye (or left eye) corrected image data in a second sense of the horizontal direction opposite the first sense, such that the horizontal position of a stereo image perceived from a left eye and a right eye image formed by the left eye and right eye corrected image data is effectively equivalent to the horizontal position of a stereo image perceived by the left eye and right eye images, and supplying the generated left eye and right eye corrected image data to predetermined display means.

According to the thirteenth aspect of the present invention, the data amount concerning the transmission of stereo image data can be greatly reduced, and the horizontal display position of stereo image provided by right eye and left eye corrected image data reconstructed in the receiving side system, is not undesirably shifted.

According to a fourteenth aspect of the present invention, there is provided a stereo image display apparatus comprising: receiving means for receiving parallax distribution data representing a parallax distribution status viewed in relation to a right eye (or left eye) image of left eye and right eye images having a binocular parallax at each predetermined position in the left eye (or right eye) display region and left eye (or right eye) image data representing a left eye (or right eye) image; desired parallax data holding means for holding predetermined desired parallax data; parallax difference data deriving means for extracting data representing a parallax in particular coordinates among the parallax distribution data and deriving data representing the difference between the extracted parallax data and the desired parallax data held in the desired parallax data holding means; parallax distribution data correcting means for correcting the entire parallax distribution data by an equal amount according to the difference data from the parallax difference data deriving means; and image data generating means capable of generating right eye (or left eye) corrected image data representing the right eye (or left eye) corrected image corresponding to the right eye (or left eye) image on the basis of the left eye (or right eye) image data received by the receiving means and the corrected parallax distribution data from the parallax distribution data correcting means, and supplying the received right eye (or left eye) image data and the left eye (or right eye) corrected image data to predetermined display means.

According to the fourteenth aspect of the present invention, the data amount concerning the transmission of stereo image data can be greatly reduced, and the horizontal display position of stereo image provided by right eye (or left eye) corrected image data reconstructed in the receiving side system permits obtaining reconstructed images with controlled binocular parallax shift means. It is thus possible to simplify the construction of the apparatus.

According to a fifteenth aspect of the present invention, there is provided a stereo image display apparatus comprising: receiving means for receiving parallax distribution data representing a parallax distribution status viewed in relation to a right eye (or left eye) image of left eye and right eye images having a binocular parallax at each predetermined position in the left eye (or right eye) display region and left eye (or right eye) image data representing a left eye (or right eye) image; desired parallax data holding means for holding predetermined desired parallax data; parallax difference data deriving means for extracting data representing a parallax in particular coordinates among the parallax distribution data and deriving data representing the difference between the extracted parallax data and the desired parallax data held in the desired parallax data holding means; parallax distribution data correcting means for correcting the entire parallax distribution data by an equal amount according to the difference data from the parallax difference data deriving means; and corrected image data generating means capable of processing the left eye (or right eye) image data received by the receiving means according to the corrected parallax distribution data from the parallax distribution data correcting means, thereby generating left eye (or right eye) corrected image data corresponding to a result of motion of the left eye (or right eye) image in a first sense of the horizontal direction and right eye (or left eye) corrected image data corresponding to a result of motion of the right eye (or left eye) corrected image data in a second sense of the horizontal direction opposite the first sense, such that the horizontal position of a stereo image perceived from a left eye and a right eye image formed by the left eye and right eye corrected image data is effectively equivalent to the horizontal position of a stereo image perceived by the left eye and right eye images, and supplying the generated left eye and right eye corrected image data to predetermined display means.

According to the fifteenth aspect of the present invention, the data amount concerning the transmission of stereo image data can be greatly reduced, and the horizontal display position of stereo image provided by right eye and left eye corrected image data reconstructed in the receiving side system, is not undesirably shifted.

According to a sixteenth aspect of the present invention, there is provided the stereo image display apparatus according to one of the twelfth to fifteenth aspects, wherein the parallax difference data deriving means extracts data representing a parallax at coordinates as a point viewed by the viewer and obtains difference data between the extracted data and the desired parallax data held by the desired parallax data holding means.

According to the sixteenth aspect of the present invention, in addition to the advantages obtainable according to the twelfth to fifteenth aspects of the present invention, a stereo image control can be obtained such as to obtain instantaneous binocular parallax matched to the viewer's viewing point.

According to a seventeenth aspect of the present invention, there is provided the stereo image display apparatus according to the aspect of the twelfth to fifteenth aspects, which further comprises data compressing means for compressing the left eye (or right eye) image and the parallax distribution data before transmission, and data expanding means for expanding the compressed left eye (or right eye) image and parallax distribution data after transmission.

According to the seventeenth aspect of the present invention, in addition to the advantages obtainable according to the twelfth to fifteenth aspects of the present invention, the amount of transmission data can be sufficiently compressed, permitting channel occupation time reduction and transmission efficiency increase.

Other objects and features will be clarified from the following description with reference to attached drawings.

BRIEF DESCRIPTION OF THE DRAWINGS

FIG. 4 is a flow chart illustrating an example of operation of the apparatus shown in FIG. 1;

FIG. 17 is a schematic view for explaining the operation of the embodiment of the present invention constructed by various parts shown in FIGS. 13 and 16;

PREFERRED EMBODIMENTS OF THE INVENTION

Preferred embodiments of the present invention will now be described with reference to the drawings.

Figure 1:
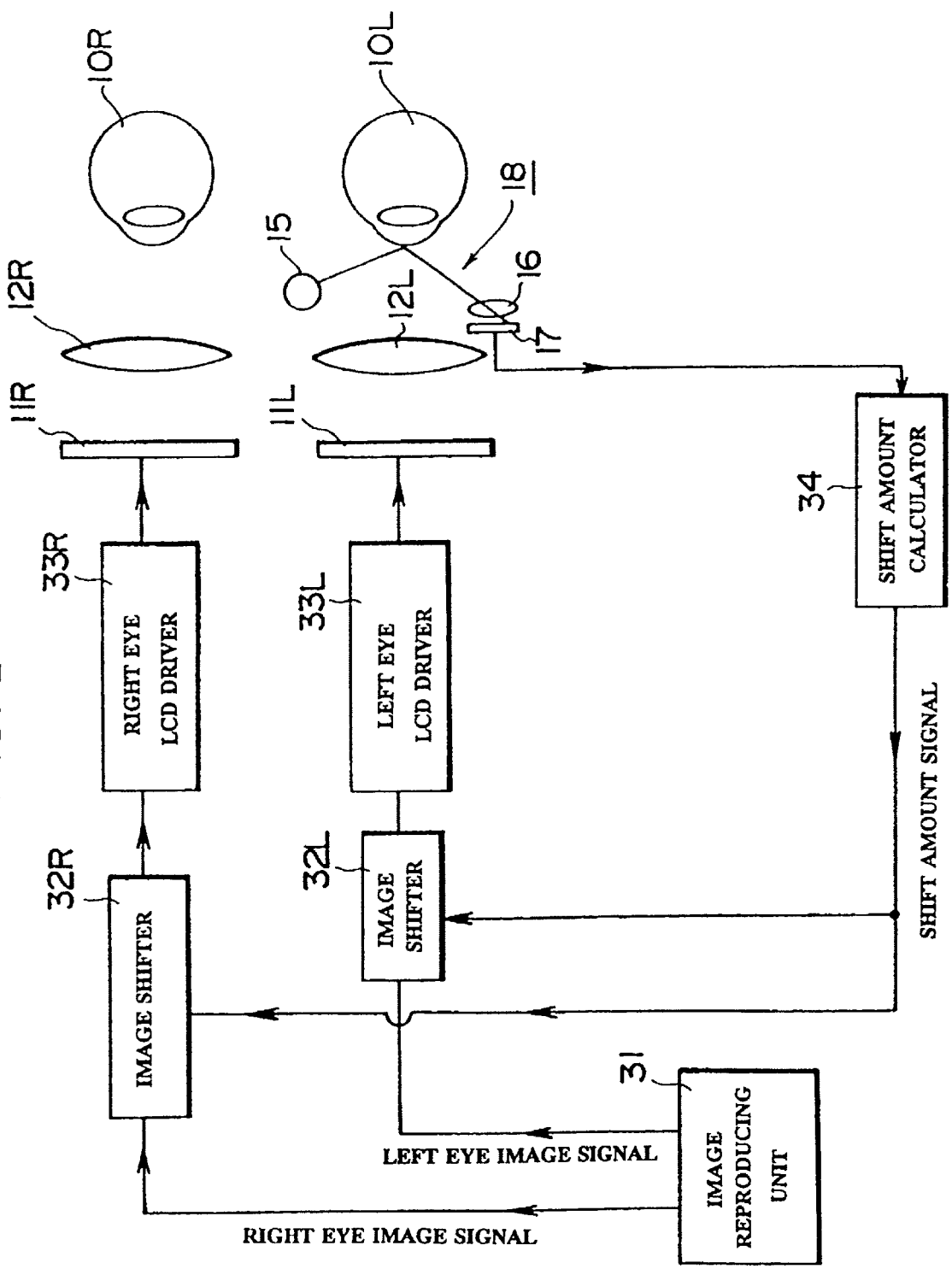
FIG. 1 is a block diagram showing an embodiment of the stereo image display apparatus according to the present invention.

FIG. 1 is a block diagram showing an embodiment of the stereo image display apparatus according to the present invention. A right eye and a left eye LCD 11R and 11L having a right eye and a left eye image display surface, are provided for a right eye 10R and a left eye 10L, respectively. Images on the display surfaces of the LCDs 11R and 11L are perceived as images through a right eye and a left eye eyepiece optical system 12R and 12L by the viewer with the right and left eyes 10R and 10L, respectively. A right eye image signal from an image reproducing unit 31, which reproduces and outputs a stereo image signal, is supplied through an image shifter 32R and a right eye LCD driver 33R to the right eye LCD 11R for display thereon. Likewise, a left eye image signal from the image reproducing unit 31 is supplied through another image shifter 32L and a left eye LCD driver 33L to the left eye LCD 11L for display thereon.

For either of the right and left eyes 10R and 10L (i.e., the left eye 10L in this case), a light source 15 for projecting infrared rays or the like toward the eyeball, and a photoelectric transducer element 17 for receiving a reflected beam of the emitted beam from the light source 15 through a lens 16, are provided. A signal representing an eyeball accommodation value, detected by an eyeball accommodation detector 18, is supplied to a shift amount calculator 34. The shift amount calculator 34 calculates necessary horizontal shift amounts of the left eye and right eye images corresponding to the eyeball accommodation value, and supplies the calculated necessary shift amount signals to image shifters 32R and 32L. According to the necessary shift amount signals, the image shifters 32R and 32L process the right eye and left eye image signals from an image reproducing unit 31 for shifting the images on the right eye and left eye LCDs 11R and 11L horizontally by the necessary shift amounts to provide for proper binocular parallax regarding the right eye and left eye images.

The image shifters 32R and 32L and shift amount calculator 34, may be constructed as an integrated or independent digital circuit or circuits serving as data processing unit or units. Also, the image reproducing unit 31 and right eye and left eye LCD drivers 33R and 33L may be entirely or partly included as a digital circuit in the data processing unit or units.

In the instant system as described, the horizontal display position of a noted image pattern on each of the right eye and left eye image display surfaces is shifted (together with the background). Alternatively, the right eye and left eye image display surfaces themselves (i.e., the right eye and left eye LCDs 11R and 11L as display devices) may be shifted. This arrangement consequently provides the shift of the horizontal display pattern (together with the background) displayed on each of the display surfaces.

Figure 2:
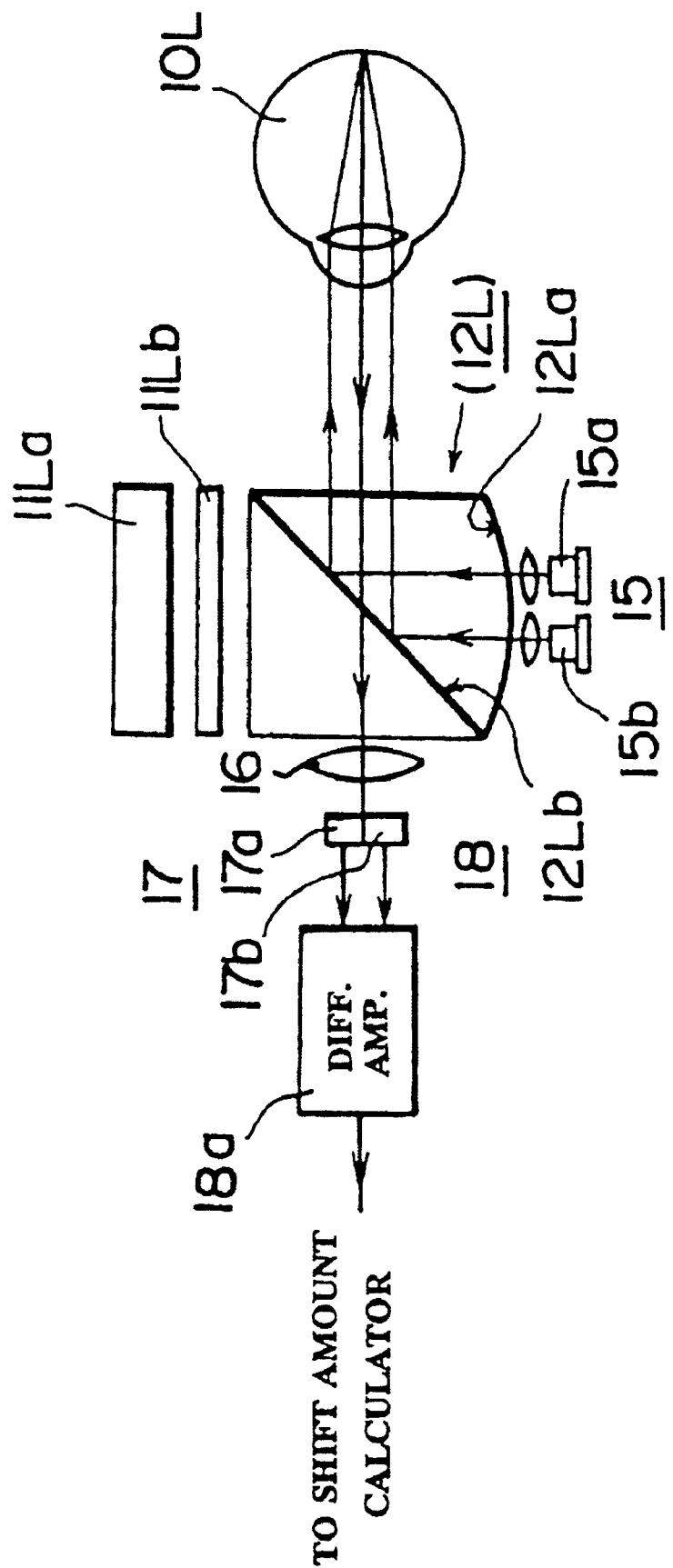
FIG. 2 is a detailed schematic view showing an example of the optical system and circuit concerning the eyeball accommodation detector 18 in the apparatus shown in FIG. 1.

FIG. 2 is a detailed schematic view showing an example of the optical system and circuit concerning the eyeball accommodation detector 18 in the apparatus shown in FIG. 1. As shown, the left eye LCD 11L in FIG. 1 includes a backlight 11L*a* and an LCD 11L*b*. The left eye eyepiece optical system 12L is a prism having a convex mirror 12L*a* on its bottom inner surface and a central, substantially diagonal half mirror 12L*b*. The light source 15 of the eyeball accommodation detector 18 includes infrared beam projecting LEDs 15*a* and 15*b*, which project parallel beams (i.e., infrared beams) at a predetermined distance. Projected beams from the infrared beam projecting LEDs 15*a* and 15*b* are reflected by the half mirror 12L*b* of the prism (i.e., left eye eyepiece optical system) 12L and projected as parallel beams onto the left eye 10L, and reflected beams therefrom are transmitted through the half mirror 12L*b* and the lens 16 and incident on a pair of photoelectric surfaces 17*a* and 17*b* of the photoelectric transducer element 17. The difference between the photoelectric transduction outputs from the photoelectric surfaces 17*a* and 17*b*, is amplified by a differential amplifier 18*a* and supplied as a signal representing the pertinent accommodation (or focus accommodation) of the eyeball to the shift amount calculator 34. An image which is provided by the left eye LCD 11L including the backlight 11L*a* and LCD 11L*b*, is once transmitted through the half mirror 12L*b*, is then reflected by the concave mirror 12L*a*, is then reflected by the lower surface of the half mirror 12L*b* and is then incident on the left eye 10L.

According to the present invention, the eyeball accommodation detector may be a well-known one.

Figure 3:
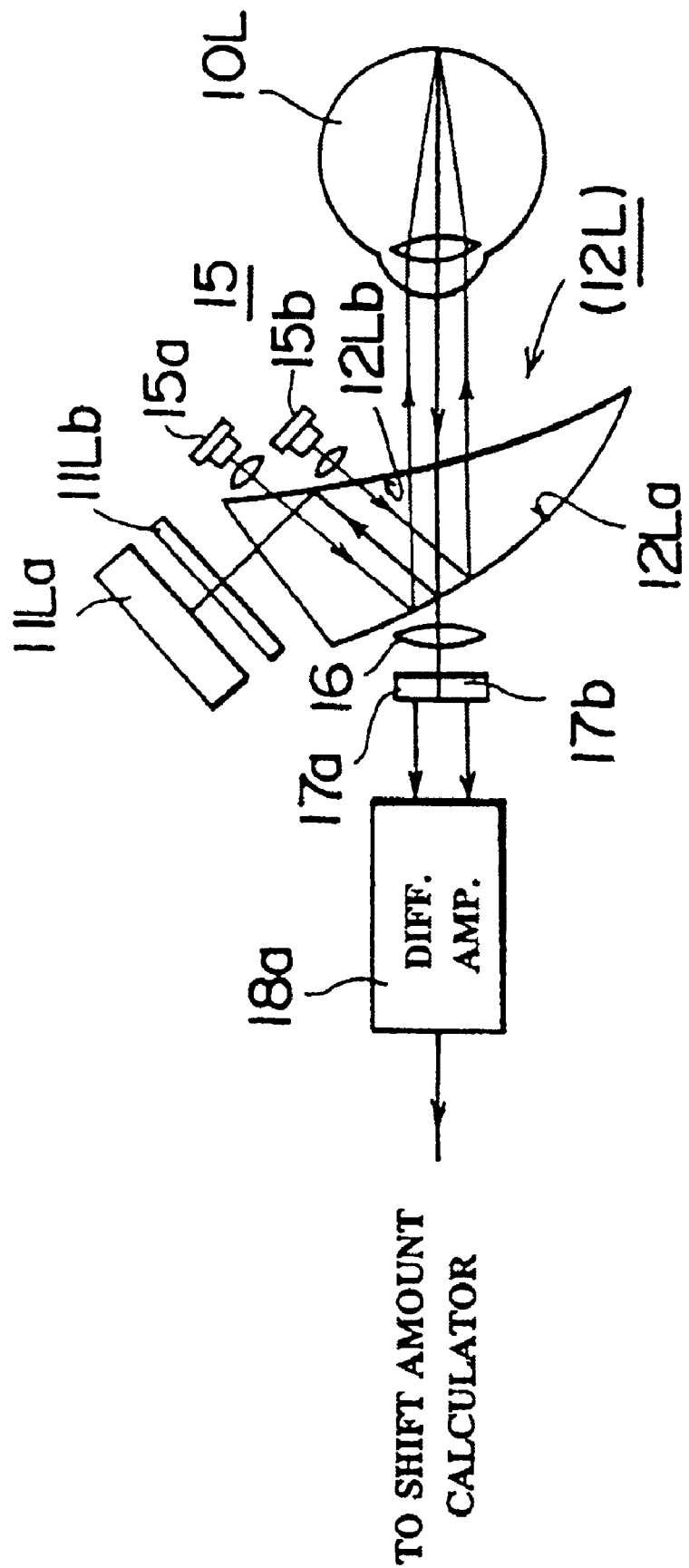
FIG. 3 is a detailed schematic view showing a different embodiment of the optical system and circuit concerning the eyeball accommodation detector in the apparatus shown in FIG. 1.

FIG. 3 is a detailed schematic view showing a different embodiment of the optical system and circuit concerning the eyeball accommodation detector in the apparatus shown in FIG. 1. In the figure, parts corresponding to those in FIG. 2 are designated by like reference symbols, while omitting their detailed description. In the example shown in FIG. 3, the convex mirror 12L*a* and half mirror 12L*b* of the prism (i.e., left eye eyepiece optical system) 12L both have non-spherical unique shapes for reducing the thickness (i.e., reducing the weight) and increasing the magnification of the prism as a whole.

FIG. 4 is a flow chart illustrating an example of operation of the apparatus shown in FIG. 1. The operation of the apparatus shown in FIG. 1 will now be described with reference to FIG. 1. Before image viewing, the eyeball accommodation is set to an initial value $A_0$ (step S1). Then, with the start of image display the eyeball accommodation detector detects the accommodation of the eyeball and recognizes an accommodation $A_t$ (step S2). The recognized accommodation $A_t$ is compared to the initial value $A_0$ noted above (step S3). When it is found as a result of the comparison in the step S3 that the accommodation $A_t$ corresponds to a point closer to the point of the initial value $A_t$, a control is made to shift the left eye and right eye images to the left and to the right, respectively, by predetermined amounts (i.e., to reduce the binocular parallax) (step S4). When it is found as a result of the comparison in the step S3 that the accommodation $A_t$ corresponds to a point remoter from the initial value $A_0$, a control is made to shift the left eye and right eye images to the right and to the left, respectively, by predetermined amounts (i.e., to increase the binocular parallax) (step S5). The steps S2 through S4 are executed repeatedly during the image viewing. The comparison in the step S3 and the control in the steps S4 and S5 are executed by the binocular parallax control means, which is constituted by the shift amount calculator 34, image shifters 32R and 32L, etc. mentioned before in connection with FIG. 1. When the accommodation $A_t$ is equal to the initial value $A_0$, the routine goes back to the step S2.

In summary of the above operation, the binocular parallax control means is adapted to cause an effective change in the binocular parallax such as to make zero the difference between a desired accommodation value and a value representing the accommodation of the eyeball detected by the eyeball accommodation detecting means, the difference being obtained as a result of the comparison. It is thus possible in this embodiment to permit viewing of stereo image with less viewer's accommodation changes.

Figure 5:
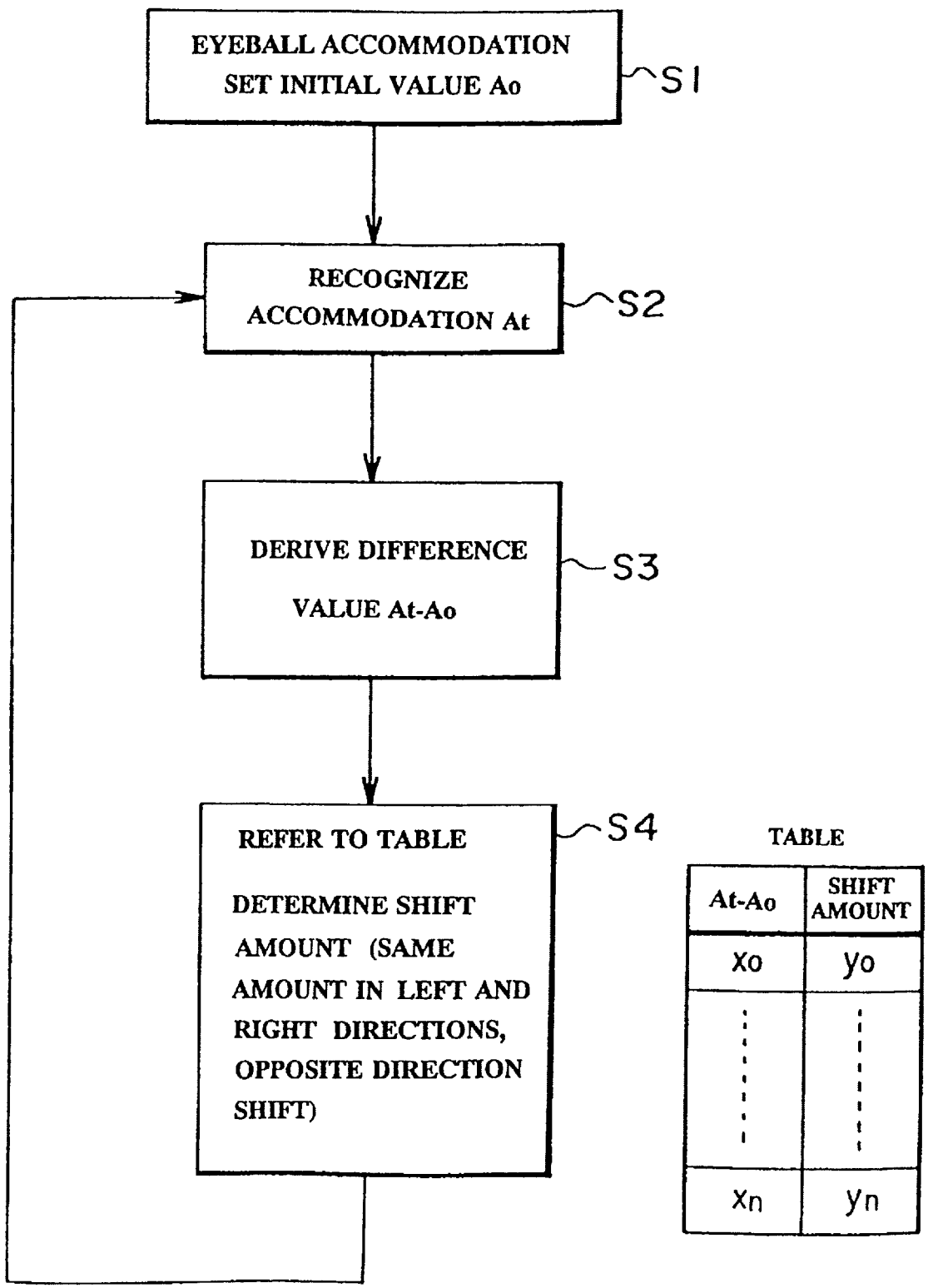
FIG. 5 is a flow chart illustrating a different example of the operation of the apparatus shown in FIG. 1.

FIG. 5 is a flow chart illustrating a different example of the operation of the apparatus shown in FIG. 1. In this operation, the eyeball accommodation is set to an initial value $A_0$ before image viewing (step S1). Then, with the image display start the eyeball detector detects the eyeball accommodation and recognizes an accommodation $A_t$ (step S2). Also, the difference $(A_t-A_0)$ between the accommodation $A_t$ and the initial value $A_0$ is obtained (step S3). In this operation mode, i.e., the routine shown in FIG. 5, necessary shift amounts concerning left eye and right eye images corresponding to various values of the difference $(A_t-A_0)$ obtained in the above way (i.e., necessary changes in these images with respect to the binocular parallax), are provided as table data. In a step S4 subsequent to the step S3, a necessary shift amount (i.e., one of values $y_0$ to $y_n$) corresponding to a particular value (i.e., one of values $x_0$ to $x_n$) as the pertinent difference $(A_t-A_0)$ as obtained above is recognized, and the left eye and right eye images are shifted in opposite directions by a pertinent necessary amount (that is, the binocular parallax concerning these images is changed). The steps S2 to S4 are executed repeatedly before the image viewing.

The process of obtaining the difference $(A_t-A_0)$ in the step S3 and the control in the step S4, are executed by horizontal display position control means (i.e., binocular parallax control means), which is constituted by the shift amount calculator 34, image shifters 32R and 32L, etc. mentioned before in connection with FIG. 1.

In summary of the operation shown in FIG. 5, the horizontal display position control means is adapted to cause an effective change in the binocular parallax according to pertinent data held in a table as necessary change data holding means, which holds various data representing the correspondence relation ($x_0$ to $x_n$:$y_0$ to $y_n$) between the result $(A_t-A_0)$ of comparison between the predetermined desired accommodation and the value representing the eyeball accommodation detected by the eyeball accommodation detecting means, and the corresponding necessary change in the distance between the horizontal positions of the left eye and right eye images displayed by the display means (i.e., shift amount).

The "necessary change data holding means" that holds the table data, may be a ROM provided in the horizontal display position control means, but this is not limitative; for instance, it is possible to employ a memory card or like device, which holds or stores data in such a form as to be capable of being read by the horizontal display position control means and is removably mounted in the apparatus.

Figure 6:
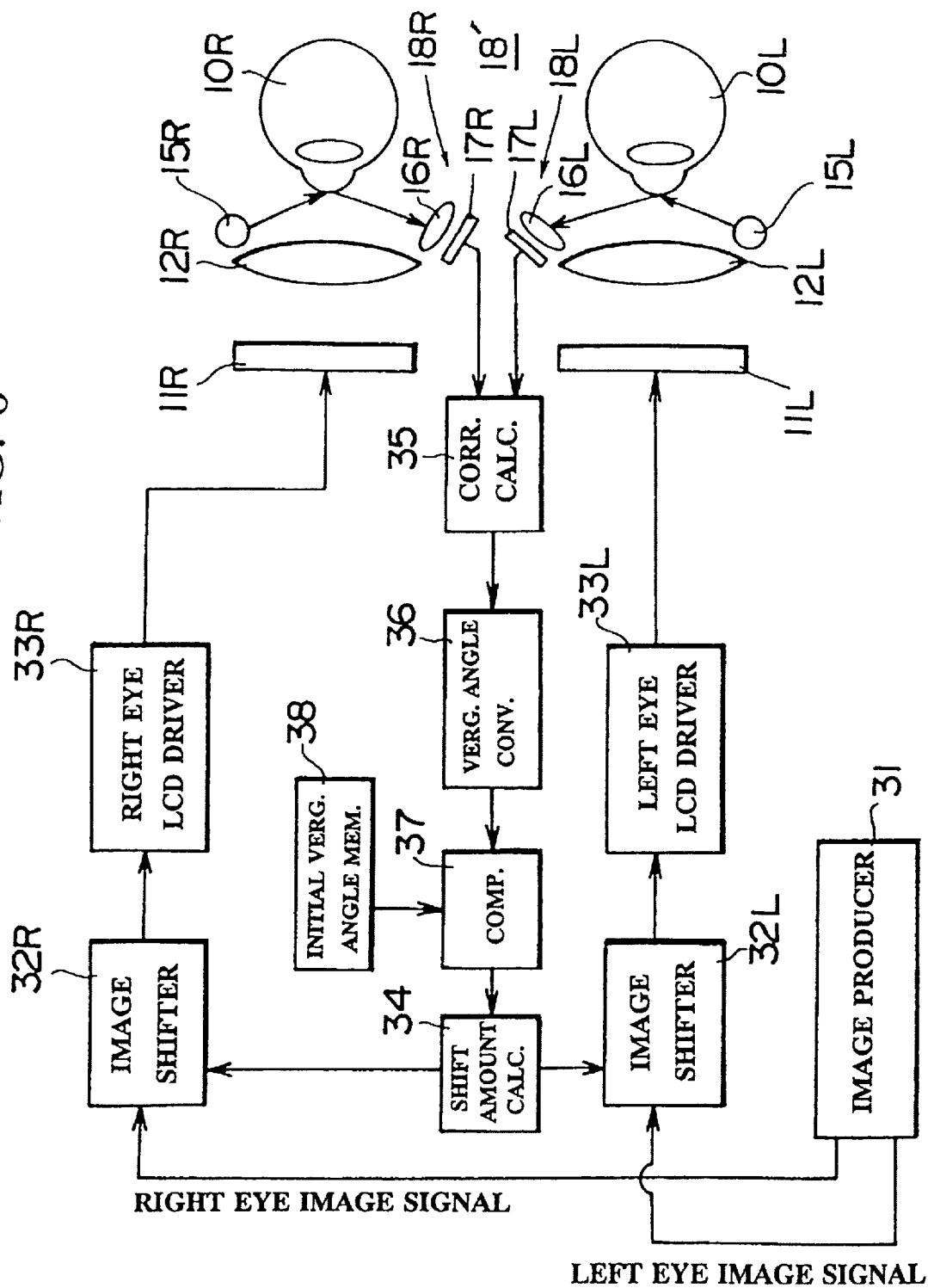
FIG. 6 is a block diagram showing a different embodiment of the stereo image display apparatus according to the present invention.

FIG. 6 is a block diagram showing a different embodiment of the stereo image display apparatus according to the present invention. Right eye and left eye LCDs 11R and 11L having right eye and left eye image display surfaces, respectively are provided for a right eye 10R and a left eye 10L, respectively. Images on the display surfaces of the LCDs 11R and 11L are perceived as images through a right eye and a left eye eyepiece optical system 12R and 12L by the viewer with the right and left eyes 10R and 10L, respectively. A right eye image signal from an image reproducing unit 31, which reproduces and outputs a stereo image signal, is supplied through an image shifter 32R and a right eye LCD 33R to the right eye LCD 11R for display thereon. Likewise, a left eye image signal from the image reproducing unit 1 is supplied through another image shifter 32L and a left eye LCD driver 33L to the left eye LCD 11L for display thereon.

For the right eye 10R, a right eye vergence angle detector 18R is provided, which includes a light source 15R for projecting infrared rays or the like toward the eyeball surface, and a photoelectric transducer element 17R for receiving a reflected beam of the emitted beam from the light source 15R through a lens 16R, and detects the vergence angle between the two eyes. In symmetry with the right eye vergence angle detector 18R, for the left eye 10R is provided, which includes a light source 15L for projecting infrared rays or the like toward the eyeball surface, and a photoelectric transducer element 18L for receiving a reflected beam of the emitted beam from the light source 13L through a lens 16L, and detects the vergence angle between the two eyes. The right eye and left eye vergence angle detectors 18R and 18L constitute an eyeball vergence angle detector 18'. Detected values from the eyeball vergence angle detector 18', representing the eyesight directions of the two eyes, are inputted to and compared with each other in a correlation calculator 35. The correlation calculator 35 calculates a value representing the relation between the two detected values, and supplies the calculated value to a next stage vergence angle calculator 36. A vergence angle converter 36 converts the calculated value from the correlation calculator 35, which corresponds to the degree of correlation between values representing the eyesight directions of the two eyes, into a corresponding vergence angle, and supplies an output representing the vergence angle to one input terminal of a next stage comparator 37. To the other input terminal of the comparator 37 is supplied initial vergence angle data held in an initial vergence angle memory 38. The comparator 37 compares the converted and initial vergence angle values supplied to the two input terminals, and supplies the result to a shift amount calculator 34. The shift amount calculator 34 calculates necessary horizontal shift amounts of the left eye and right eye images corresponding to the vergence angle accommodation value, and supplies the calculated necessary shift amount signals to image shifters 32R and 32L. According to the necessary shift amount signals, the image shifters 32R and 32L process the right eye and left eye image signals from the image reproducing unit 31 for shifting the images on the right eye and left eye LCDs 11R and 11L horizontally by the necessary shift amounts to provide for proper binocular parallax regarding the right eye and left eye images.

The image shifters 32R and 32L, shift amount calculator 34, correlation calculator 35, vergence angle converter 36 and comparator 37, may be constructed as an integrated or independent digital circuit or circuits serving as data processing unit or units. Also, the image reproducing unit 31 and right eye and left eye LCD drivers 33R and 33L may be entirely or partly included as a digital circuit in the data processing unit or units.

Figure 7:
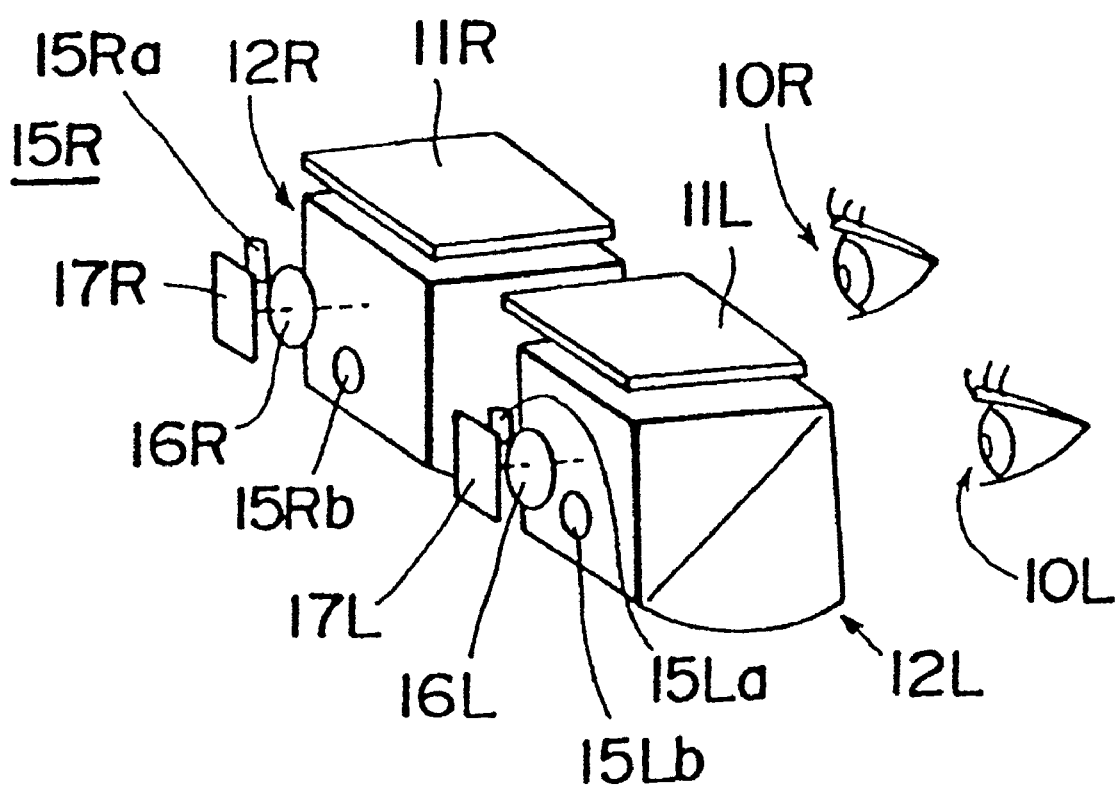
FIG. 7 is a detailed perspective view showing the optical system concerning the eyeball vergence angle detector 18' in the apparatus shown in FIG. 6.

FIG. 7 is a detailed perspective view showing the optical system concerning the eyeball vergence angle detector 18' in the apparatus shown in FIG. 6. The right eye eyepiece optical system 12R is a prism having a concave mirror provided on its bottom inner surface and a half mirror a central, substantially diagonal half mirror. For the right eye 10R, the light source 15R which projects infrared rays or the like toward the eyeball surface, includes a pair of infrared beam projection LEDs 15R$a$ and 15R$b$ for projecting respective beams (i.e., infrared beams) making a predetermined angle therebetween. Beams projected from the infrared beam projection LEDs 15R$a$ and 15R$b$ are transmitted through the half mirror of the prism 12R at a predetermined mutual angle toward the right eye 10L, and the reflected beams therefrom are transmitted through the lens 16R and focused on the photoelectric surface of the photoelectric transducer element (i.e., area sensor) 17R.

The left eye eyepiece optical detecting system is in line symmetry with respect to the right eye eyepiece optical detecting system described above, and it can be understood with reference to the figure by replacing "R" in the reference symbols in the figure with "L".

Figure 8A:
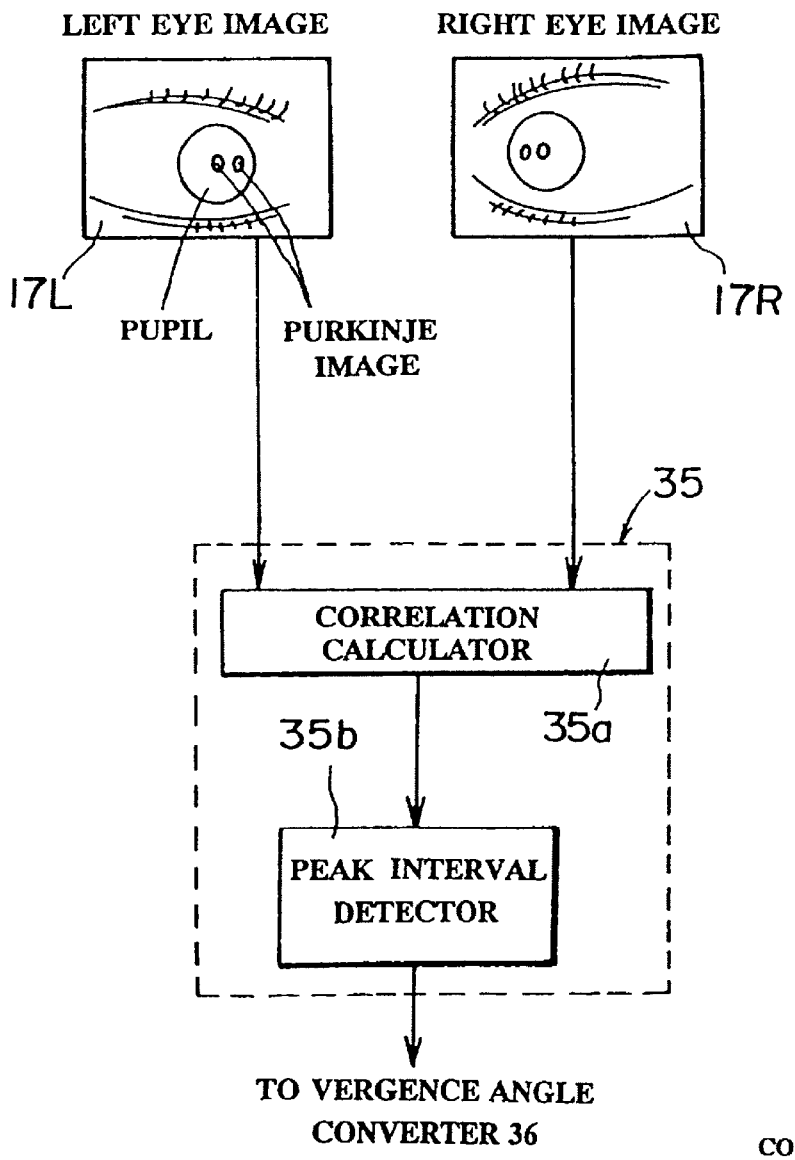
FIGS. 8(a) and 8(b) are schematics for explaining the principles underlying the vergence angle detection in the eyeball vergence angle detector 18' (FIG. 6) having the optical system shown in FIG. 7.
Figure 8B:
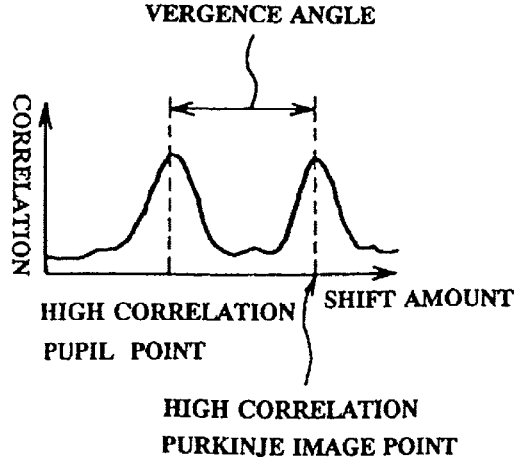

FIG. 8($a$) is a schematic for explaining the principles underlying the vergence angle detection in the eyeball vergence angle detector 18' (FIG. 6) having the optical system shown in FIG. 7. Reflected beams as a result of reflection of the two projected beams from the pair of infrared beam projection LEDs 15R$a$ and 15R$b$ described above in connection with FIG. 7, are focused on the right eye area sensor. The images formed by the focusing are called Purkinje images. The right eye area sensor 17R detects the Purkinje images and the pupil image. Likewise, in the left eye eyepiece optical system the left eye area sensor 17L detects the Purkinje images and pupil image. The detected images from the two eyes are inputted to the correlation calculator 35. In the correlation calculator 35, a correlation calculating section 35$a$ as a first stage executes operations of calculation concerning the correlation between the images of the two eyes. As a result, a peak of correlation between the pupil images of the two eyes and a peak of correlation between the Purkinje images of the two eyes appear, as shown in 8($b$). According to the result of the operations, an inter-peak interval detector 35$b$ as a second stage calculates the interval between the Purkinje image correlation peak and the pupil image correlation peak, and supplies the calculated inter-peak interval data to the next stage vergence angle converter 36. The vergence angle calculator 36 converts a value corresponding to the calculated data in the correlation calculator 35 into a corresponding vergence angle.

Figure 9:
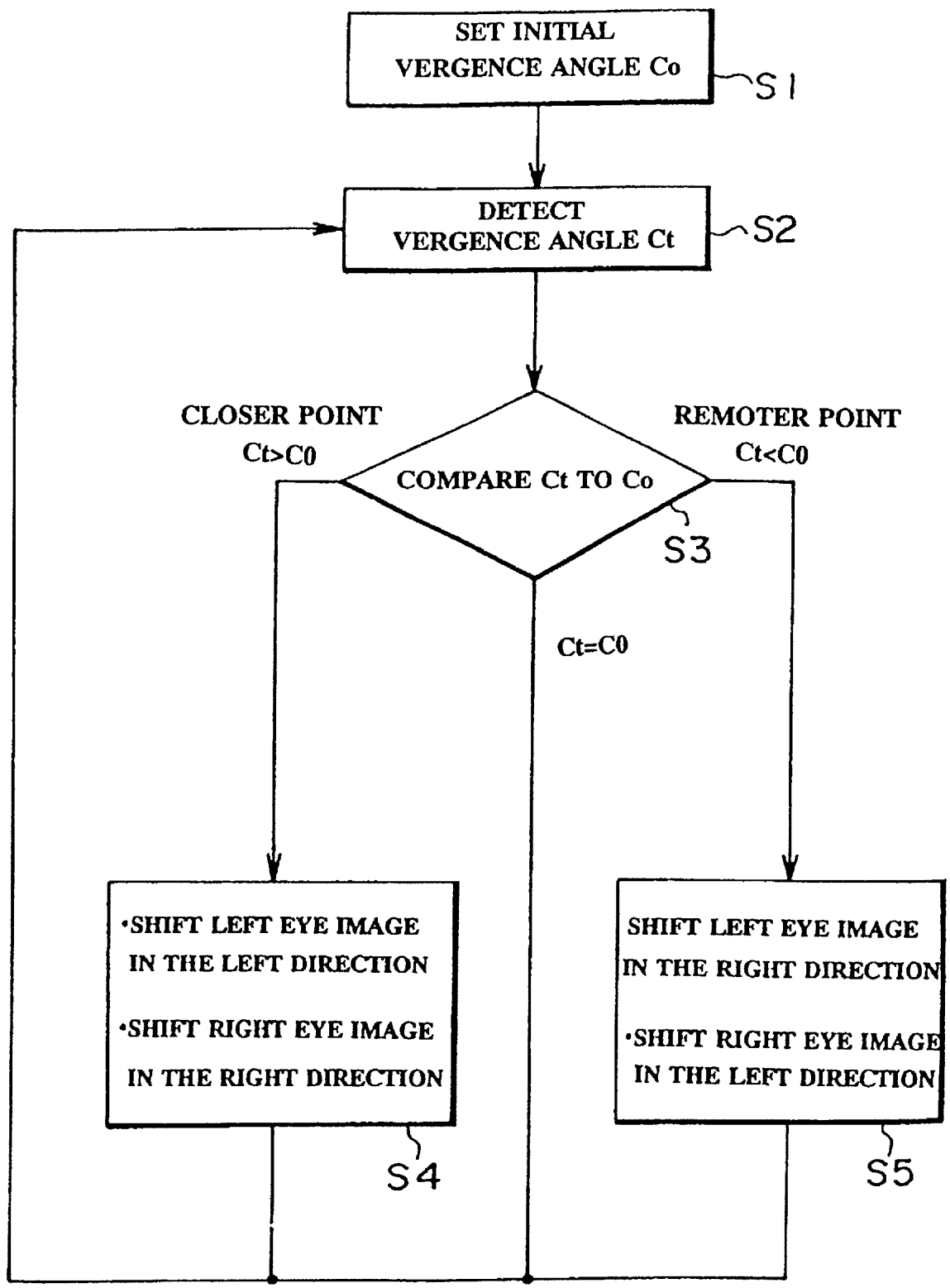
FIG. 9 is a flow chart illustrating an example of operation of the apparatus shown in FIG. 6.

FIG. 9 is a flow chart illustrating an example of operation of the apparatus shown in FIG. 6. The operation of the apparatus shown in FIG. 6 will now be described with reference to this flow chart. Before the image viewing, the vergence angle is set to an initial value $C_0$ (step S1). Then, with the start of image display the vergence angle detector detects the vergence angle of the eyeballs and recognizes a vergence angle $C_t$ (step S2). The recognized vergence angle $C_t$ is compared to the initial value $C_0$ (step S3). When it is found as a result of the comparison in the step S3 that the vergence angle $C_t$ corresponds to a point closer to the point of the initial value $C_0$ ($C_t > C_0$), a control is made to shift the left eye and right eye images to the left and to the right, respectively, by predetermined amounts (i.e., to reduce the binocular parallax) (step S4). When it is found as a result of the comparison in the step S3 that the vergence angle $C_t$ corresponds to a point remoter from the point of the initial value $C_0$ ($C_t < C_0$), a control is made to shift the left eye and right eye images to the right and to the left, respectively, by redetermined amounts i.e., to increase the binocular parallax) (step S5). The steps S2 through S5 are executed repeatedly during the image viewing. The steps S4 and S5 are executed repeatedly before the image viewing. The comparison in the step S3 and the controls in the steps S4 and S5 are executed by binocular parallax control means, which is constituted by the image shifters 32R and 32L, shift amount calculator 34, correlation calculator 35, vergence angle calculator 36, comparator 37, etc. mentioned before in connection with FIG. 6. When the controlled vergence angle $C_t$ is equal to the initial value $C_0$, the routine goes back to the step S2. In summary of the above operation, the binocular parallax control means is adapted to effectively change the binocular parallax to make zero the difference between a predetermined desired vergence angle and a value representing the vergence angle of the eyeballs detected by the vergence angle detecting means as a result of the comparison.

The right eye and left eye images are shifted by an equal amount in opposite directions. Unless the two images are shifted by an equal amount, the horizontal position of the as a result of merging of images attributable to the left and right eyes would be different before and after the shift, resulting in image position changes to the left and right with every change in the viewer's vergence angle. This is undesired for image viewing. To solve this problem, the right eye and left eye images are shifted substantially by an equal amount.

Figure 10:
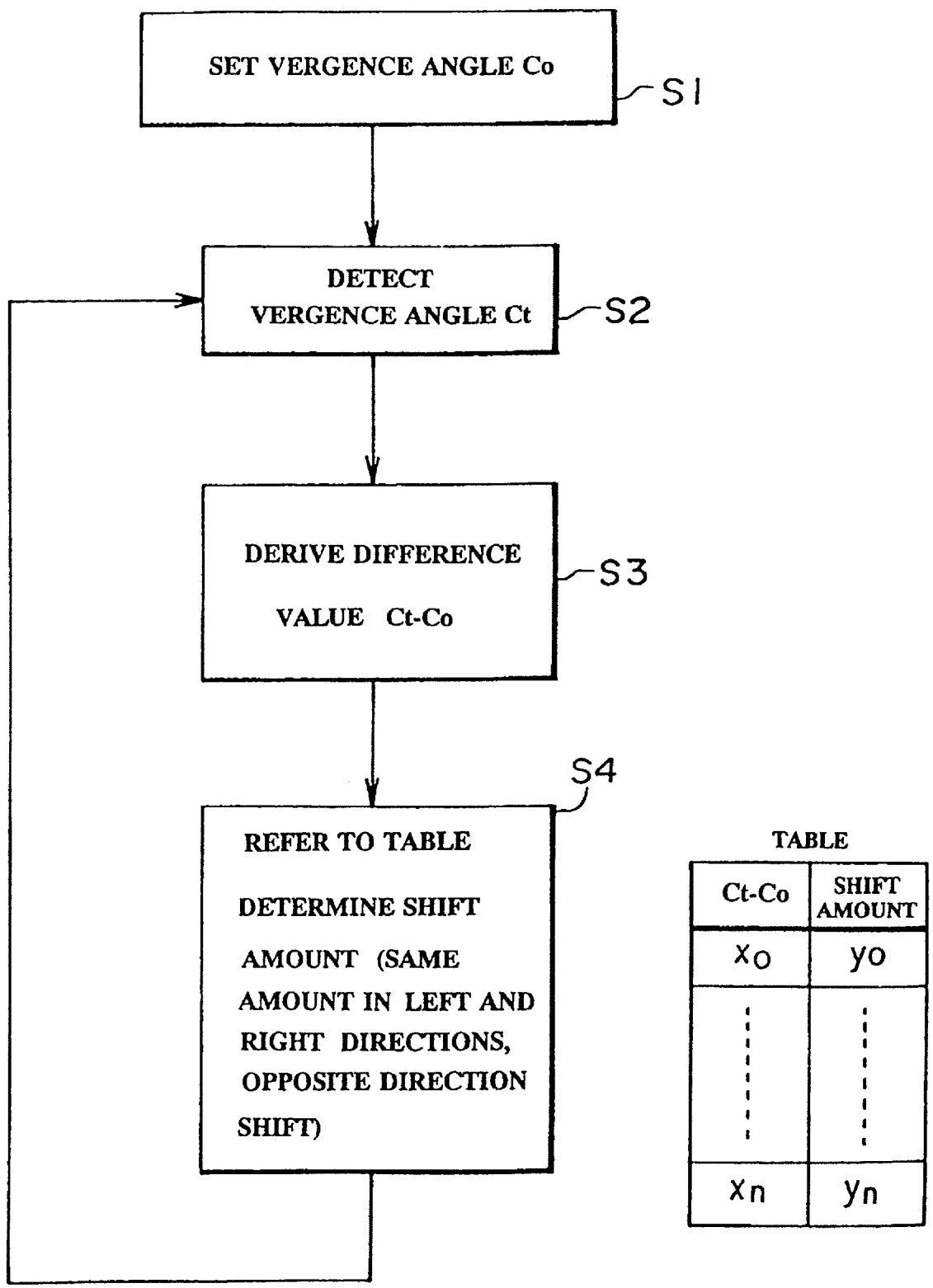
FIG. 10 is a flow chart illustrating a different example of the operation of the apparatus shown in FIG. 6.

FIG. 10 is a flow chart illustrating a different example of the operation of the apparatus shown in FIG. 6. In this operation, like the preceding example, before the image viewing the vergence angle is set to an initial value $C_0$ (step S1), and then with the image display start the vergence angle detector detects the vergence angle of the eyeballs and recognizes a vergence angle Ct (step S2). Then, the difference ($C_t - C_0$) between the vergence angle $C_t$ and the initial value $C_0$ is derived (step S3). In this operation mode, i.e., the routine shown in FIG. 10, necessary shift amounts concerning left eye and right eye images corresponding to various values of the difference ($C_t - C_0$) obtained in the above way (i.e., necessary changes in these images with respect to the binocular parallax) are provided as table data. In a step S4 subsequent to the step S3, a necessary shift amount (i.e., one of values $y_0$ to $y_n$) corresponding to a particular value (i.e., one of values $x_0$ to $x_n$) as the pertinent difference ($C_t - C_0$) obtained on the basis of the table data is recognized, and the left eye and right eye images are shifted in opposite directions by a pertinent necessary amount (that is, the binocular parallax concerning these images is changed). The steps S2 to S4 are executed repeatedly before the image viewing.

The process of obtaining the difference ($C_t$–$C_0$) in the step S3 and the control in the step S4, are executed by horizontal display position control means (i.e., binocular parallax control means), which is constituted by the shift amount calculator 34, correlation calculator 35, vergence angle calculator 36, comparator 37, image shifters 32R and 32L, etc. mentioned before in connection with FIG. 6.

In summary of the operation shown in FIG. 10, the horizontal display position control means is adapted to cause an effective change in the binocular parallax according to pertinent data held in a table as necessary change data holding means, which holds various data representing the corresponding relation ($x_0$ to $x_n$:$y_0$ to $y_n$) between the result ($C_t$–$C_0$) of comparison between the predetermined desired vergence angle $C_0$ and the value $C_t$ representing the vergence angle detected by the vergence angle detecting means, and the corresponding necessary change in the distance between the horizontal positions of the left eye and right eye images displayed by the display means (i.e., shift amount). The "necessary change data holding means" that holds the table data, may be a ROM provided in the horizontal display position control means, but this is not limitative; for instance, it is possible to employ a memory card or like device, which holds or stores data in such a form as to be capable of being read by the horizontal display position control means which is removably mounted in the apparatus.

Figure 11:
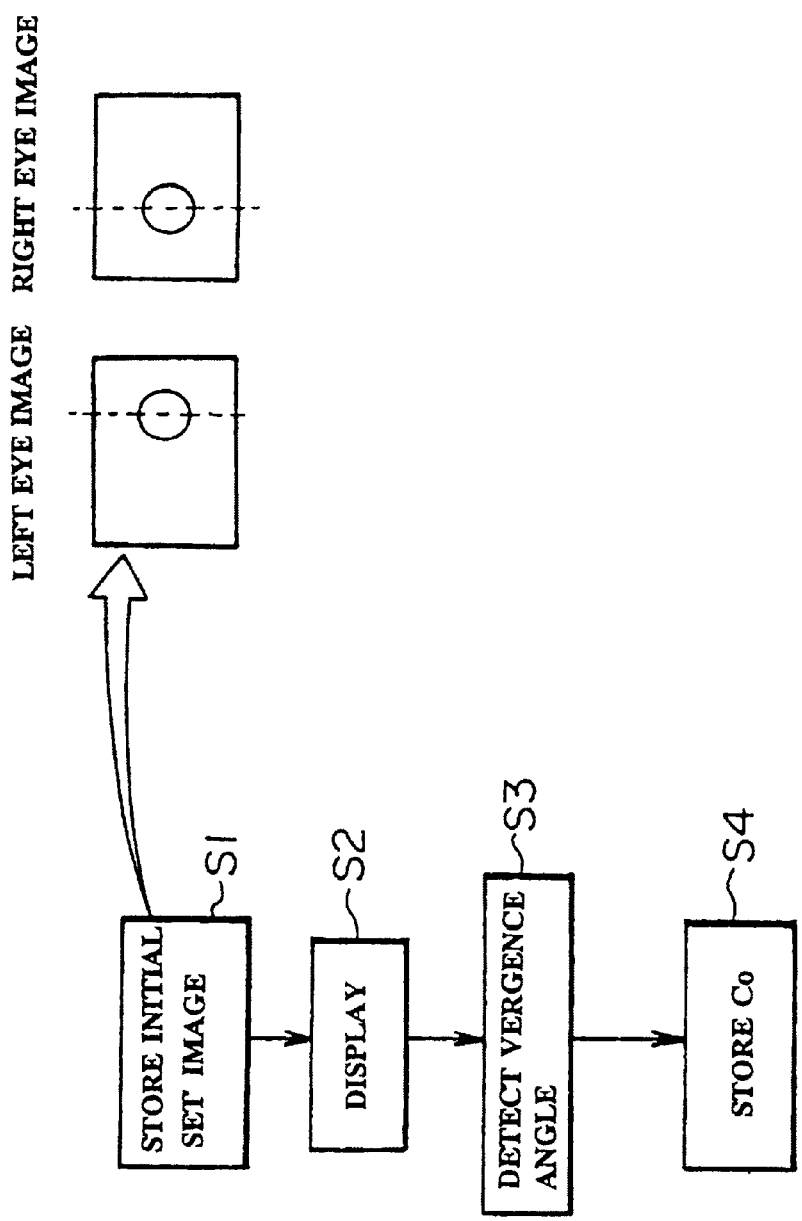
FIG. 11 is a flow chart illustrating a process for setting the initial value $C_0$ concerning the vergence angle in the cases of FIGS. 9 and 10.

FIG. 11 is a flow chart illustrating a process for setting the initial value $C_0$ concerning the vergence angle in the cases of FIGS. 9 and 10. Left eye and right eye images are first stored as reference patterns for the initial value setting in a predetermined memory (step S1). The stored reference patterns are then read out and displayed on the right eye and left eye LCDs 11R and 11L (FIGS. 1 and 6) (step S2). While the viewer is viewing the images thus displayed as the reference patterns, the vergence angle detector 18' mentioned above detects the actual vergence angle by measurement (step S3). The detected vergence angle $C_0$ is then stored in a predetermined memory means (step S4). The stored vergence angle $C_0$ is the initial value $C_0$ concerning the vergence angle as set in the step S1 of the flow charts shown in FIGS. 9 designates a stereo image generator, which comprises a pair of stereo cameras 101, a pair of microphones 102, a parallax distribution signal generator 103, a parallax distribution signal compressor 104, a left eye image signal compressor 105, a first stage multiplier 106, a second stage multiplexer 107, and a transmitter 108. The stereo cameras 101 supply left eye and a right eye image signals 111 and 112, respectively, to the parallax distribution signal generator 103 which are processed therein to generate a parallax distribution signal 113. The parallax distribution signal 113 represents a parallax map corresponding to the parallax distribution at each position on the left eye image display surface.

The parallax distribution signal generator 103 outputs the original left eye image signal 111 along with the parallax distribution signal 113. These outputs are compressed in the parallax distribution signal compressor 104 and the left eye image signal compressor 105 into a compressed parallax distribution signal 114 and a compressed left eye image signal 115. The signals 114 and 115 are supplied to the first stage multiplier 106 for multiplification. The multiplification output of the first stage multiplier 106 is supplied, along with a right and a left voice signal 116 and 117, to the second stage multiplier 107 for and 10.

Figure 12A:
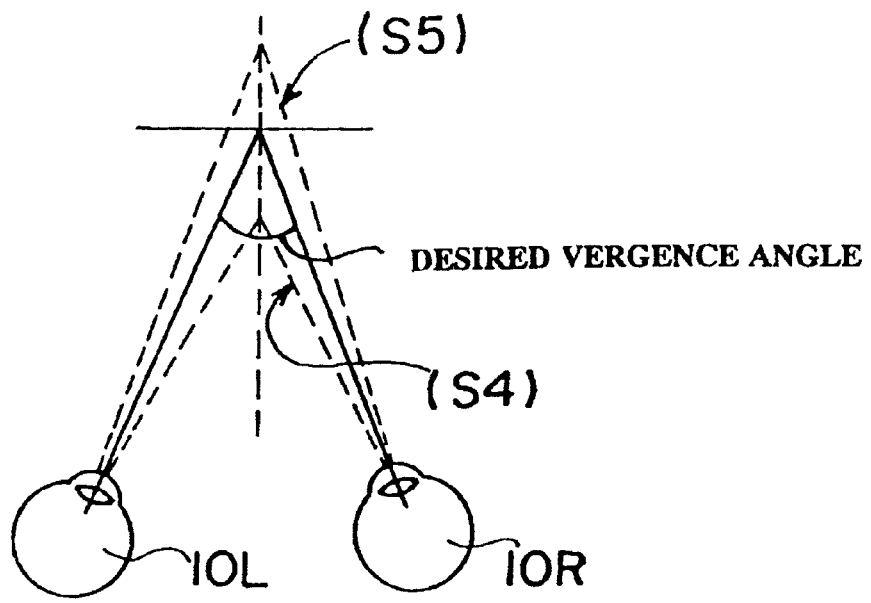
FIGS. 12(a), 12(b) and 12(c) are schematics views for explaining the operation of binocular parallax correction in the steps S4 and S5 in the flow chart shown in FIG. 9.
Figure 12B:
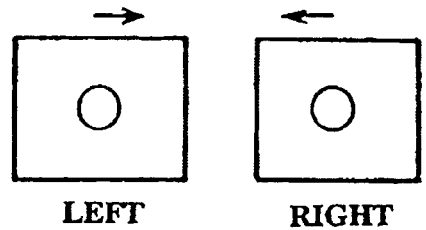
Figure 12C:
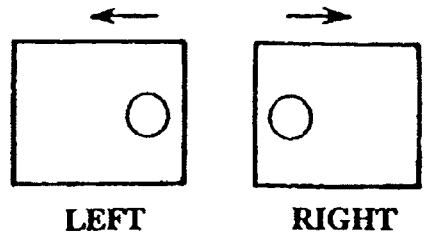

FIG. 12 is a schematic view for explaining the operation of binocular parallax correction in the steps S4 and S5 in the flow chart shown in FIG. 9. As has been described in connection with FIG. 9 and shown in FIG. 12, when the detected vergence angle $C_t$ corresponds to a point closer than the point of the desired value $C_0$ ($C_t$>$C_0$), a control is made to shift the left eye and right eye images to the left and to the right, respectively (i.e., to reduce the binocular parallax). When the detected vergence angle Ct corresponds to a point remoter than the point of the desired value $C_0$ ($C_t$<$C_0$), the left eye and right eye images are shifted to the right and to the left, respectively, (i.e., to increase the binocular parallax). Consequently, in this embodiment the stereo image with less vergence angle changes can be provided to the viewer.

Figure 13:
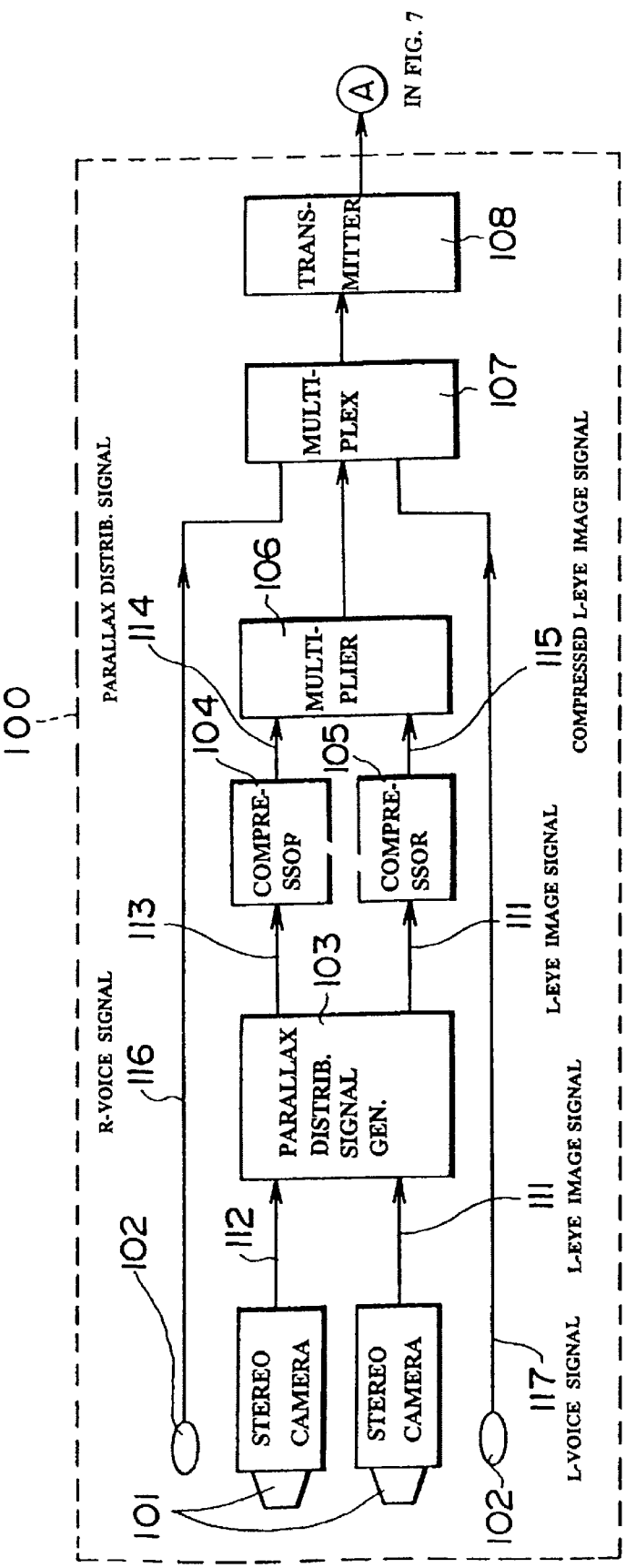
FIGS. 13 and 14 are block diagrams showing a further embodiment of the present invention.
Figure 14:
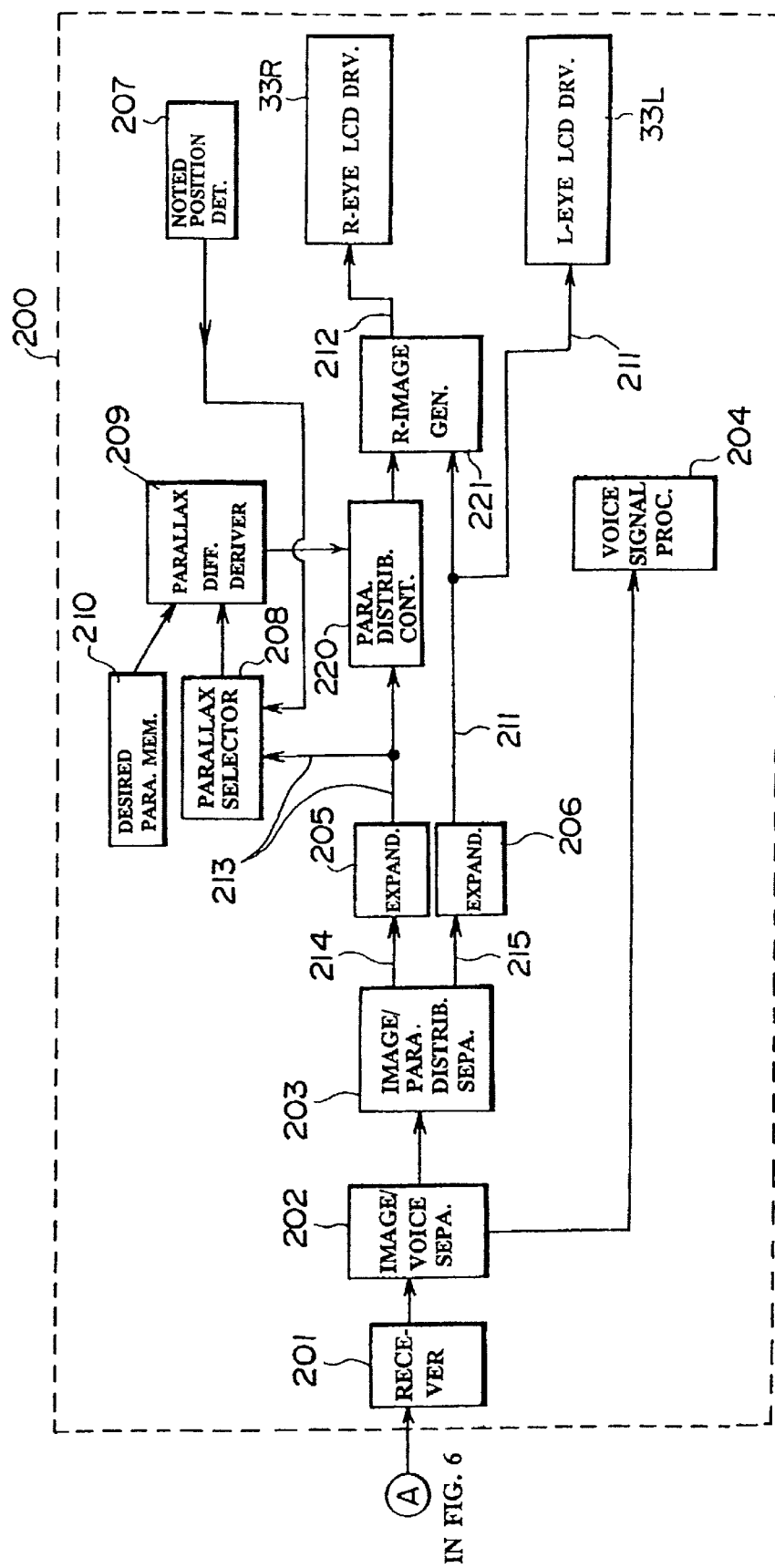

FIGS. 13 and 14 are block diagrams showing a further embodiment of the present invention. Specifically, FIG. 13 is a block diagram showing a stereo image generating side of the embodiment of the stereo image display apparatus according to the present invention, and FIG. 14 is a block diagram showing a stereo image processing side of the same apparatus. The stereo image processor may be an HMD.

In to FIG. 13, reference numeral 100 multiplification. The multiplification output of the multiplier 107, obtained from the image signal, parallax distribution signal and voice signals, is transmitted through the transmitter 108 to a stereo image processor 200 shown in FIG. 14.

In the stereo image processor 200 shown in FIG. 14, the output transmitted from the transmitter 108 in the stereo image generator 100 shown in FIG. 13, obtained through multiplification of the image signal, parallax distribution signal and voice signals, is received by a receiver 201. An image/voice separator 202 separates an image signal part and a voice signal part from the received signals. The separated image signal part is supplied to a next stage image/parallax distribution signal separator 203, while the voice signal part is supplied to a voice signal processor 204 for a predetermined signal processing to generate voice. The image/parallax distribution signal separator 203 separates the image signal part input to reproduce and output the compressed parallax distribution signal 214 and the compressed left eye image signal 215. The reproduced signals 214 and 215 are supplied to a parallax distribution signal expander 205 and a left eye image signal expander 206 for expansion into the parallax distribution signal 213 and the left eye image signal 211.

The parallax distribution signal 213 corresponds to the signal 113 shown in FIG. 13 and represents the parallax map concerning the left eye image display surface as described before. This signal 213 is supplied to a parallax signal selector 208, which selectively extracts the parallax value at a particular coordinate position (or region) on the parallax map concerning the left eye image display surface as noted by the viewer as described before and detected by a noted position detector 207. The extracted parallax signal concerning the particular coordinate position (or region) is inputted to one input terminal of a parallax difference deriving circuit 209. To the other input terminal of the parallax difference deriving circuit 209, a signal representing a predetermined desired parallax is inputted from a desired parallax memory 210, which holds the desired parallax value. The parallax difference deriving circuit 209 generates a difference signal representing the difference between the values of the two input signals, i.e., the extracted parallax signal and the desired parallax signal. The parallax distribution signal 213 as the output of the parallax distribution signal expander 205, is inputted to a control signal input terminal of a parallax distribution signal controller 220. To a control signal input terminal of the parallax distribution signal controller 220 is inputted the parallax signal from the difference deriving circuit 208 mentioned before. According to the difference signal, the parallax distribution signal 213 inputted to the control signal input terminal is controlled such that it is increased or reduced by an equal amount for all the level values of the parallax map.

The signal which has been obtained through the above control in the parallax distribution signal controller 220 and corresponds to the parallax map, is inputted to one input terminal of the right eye image generator 221. To the other input terminal of the right eye image generator 221 is supplied the left eye image signal 211 obtained through the signal expansion in the left eye image signal expander 206. According to these two input signals, the right eye image generator 221 reconstructs and outputs a right eye image signal 212 with controlled parallax difference from the desired parallax. The right eye image signal 212 thus reconstructed and the left eye image signal 211 obtained through the signal expansion in the left eye image signal expander 206, are inputted to the right eye and left eye LCD drivers 33R and 33L, respectively, which reproduce stereo image with a proper binocular parallax. It is to be noted here that the output siganl corresponding to the accomodated parallax map from parallax distribution signal controller 220 and the left (right) eye image siganl may once be stored in the memory.

The various circuits described above in connection with FIGS. 13 and 14, can be realized as respective functional sections of operational means including digital circuits and/or a microcomputer.

It is further possible to adopt as the above apparatus a construction in which the roles of the left eye and right eye image system are inverted (or interchanged). In this embodiment, it is consequently possible to provide stereo image with less vergence angle changes to the viewer.

Figure 15:
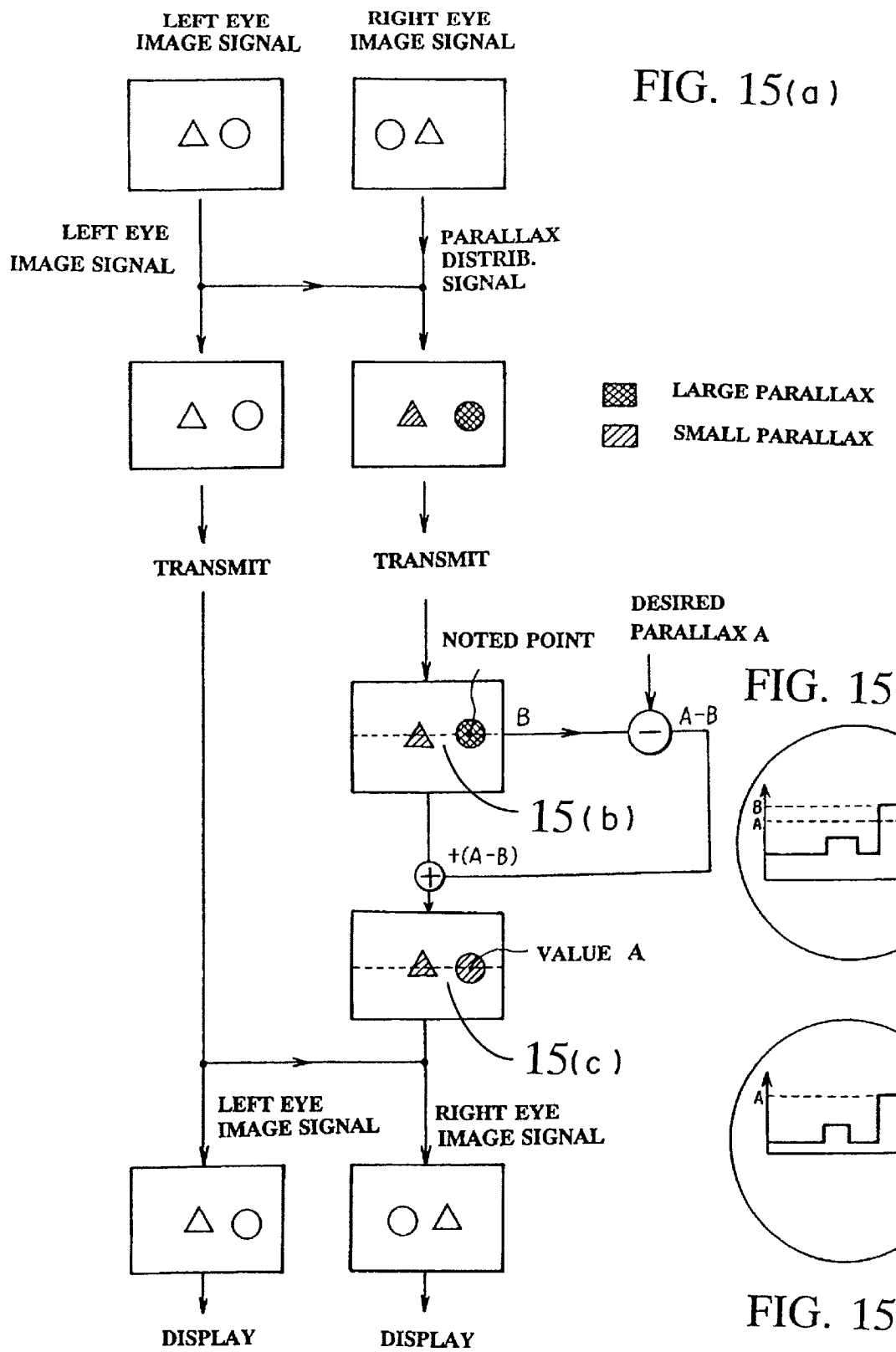
FIGS. 15(*a*)–15(*c*) schematic views for explaining the operation of the embodiment of the present invention constituted by various parts shown in FIGS. 13 and 14.

FIGS. 15(a)–(c) are schematic views for explaining the operation of the embodiment of the present invention constituted by various parts shown in FIGS. 13 and 14. A parallax distribution signal representing the position distribution of parallax (i.e., parallax map) concerning the left eye image display surface, is generated on the basis of a right eye and a left eye images of the triangular pyramid and the sphere. As described before, the parallax distribution signal (representing the parallax map) and the left eye image signal are compressed and transmitted from the stereo image generator 100 to the stereo image processor 200. The parallax distribution signal has an image signal level corresponding to the magnitude of the parallax, for instance. In the illustrated example, the brightness of the image of the sphere, for which the parallax is high, is high, while the brightness of the image of the triangular pyramid, for which the parallax is low, is low.

It is well known in the art that when transmitting the compressed parallax distribution signal and left eye compressed image signal, the amount of transmitted data is far less compared to the case of transmitting the compressed right eye image signal and left eye image signal.

In the stereo image processor 200, a difference signal (A–B), which is the difference between the received and expanded (i.e., restored) parallax distribution signal and the signal A representing the desired parallax mentioned before in connection with FIG. 14, is derived. According to this difference (A–B), the parallax distribution signal is controlled such that it is increased or reduced by an equal amount with respect to the parallax levels on the entire parallax map. In the illustrated example, the parallax levels of a substantially central horizontal line on the display surface, including the parallax level of the triangular pyramid representing a relatively low hill and the parallax level of the sphere representing a relatively high hill, are entirely reduced by an equal amount through the level control. In other words, the parallax of the parallax map is corrected such that it is reduced over the entire display surface.

A right eye image signal with corrected parallax is reconstructed in dependence on the left eye image signal obtained as a result of the expansion of the left eye compressed image signal and parallax of the corrected parallax map. Thus, in this embodiment a parallax corrected image can be obtained on the receiving side (i.e., the stereo image processor 200 in this embodiment) without specific means for shifting the horizontal display position of the reproduced image for the parallax collection. The binocular parallax thus can be corrected with a simple construction.

Figure 16:
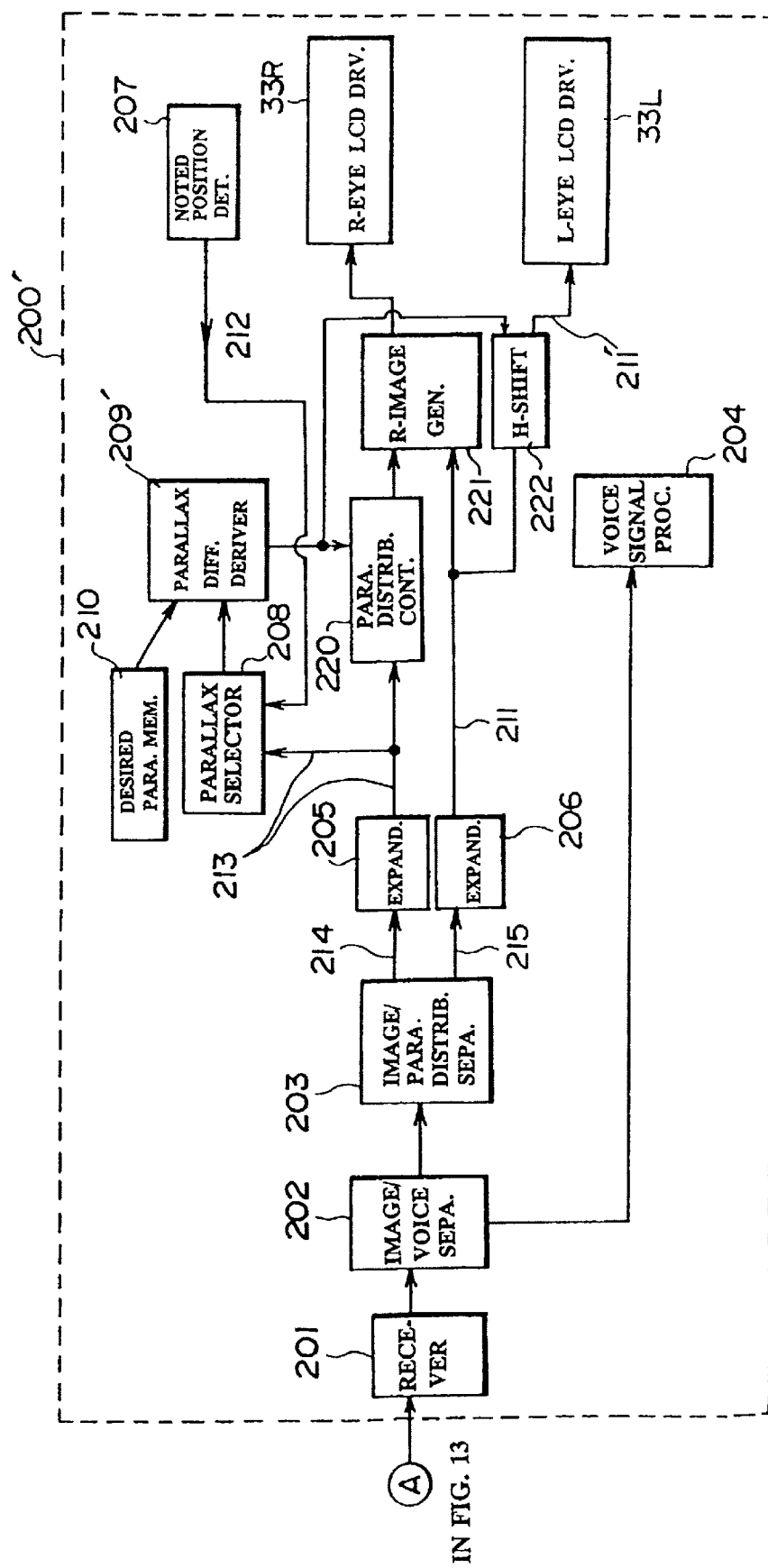
FIG. 16 is a block diagram showing a further embodiment of the present invention, which comprises a stereo image generator which is entirely the same as the stereo image generator 100 shown in FIG. 13 and an associated stereo image processor.
Figure 18:
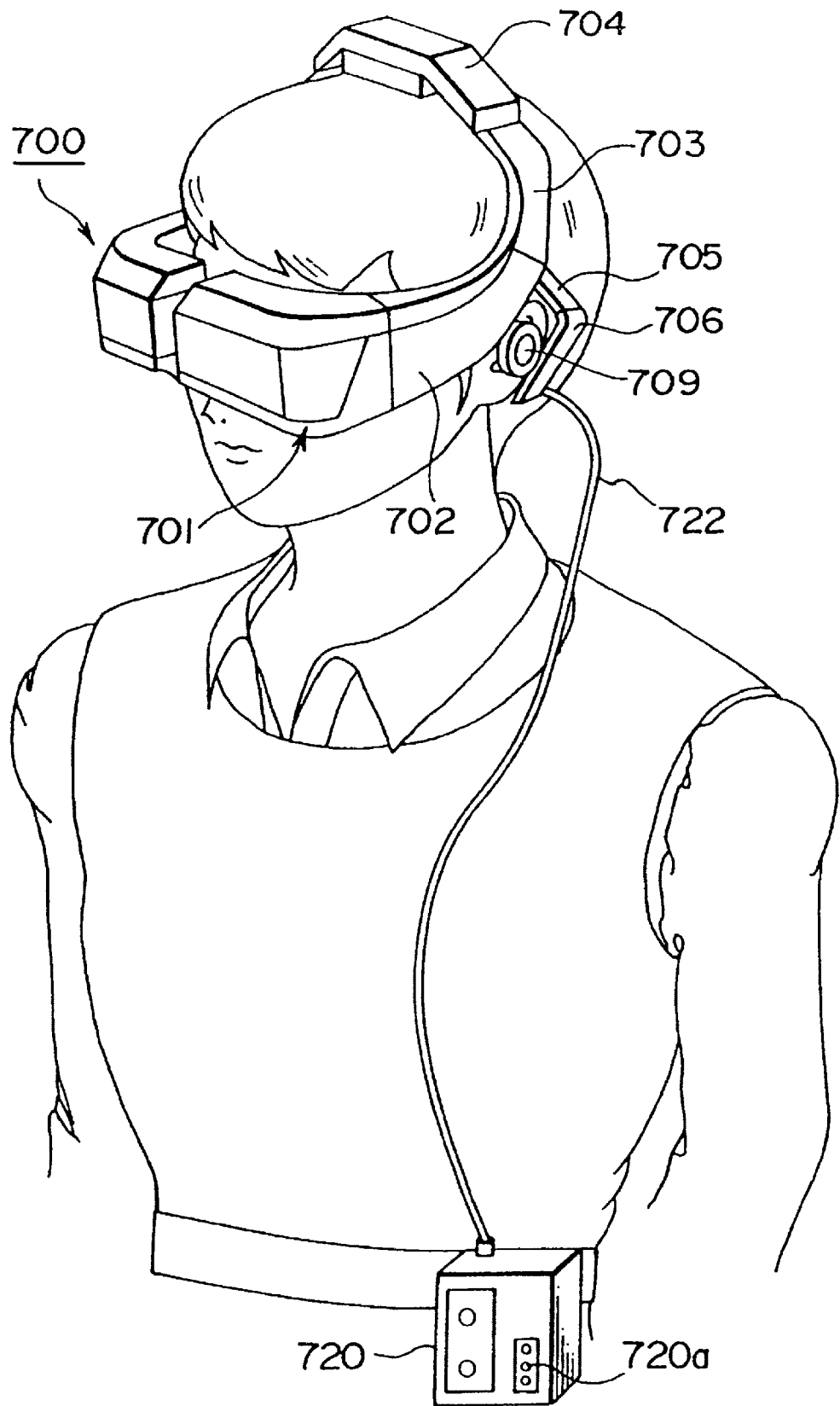
FIG. 18 is a perspective view showing a head-mounted display (HMD) 700 as an example of such stereo video display apparatus.
Figure 19:
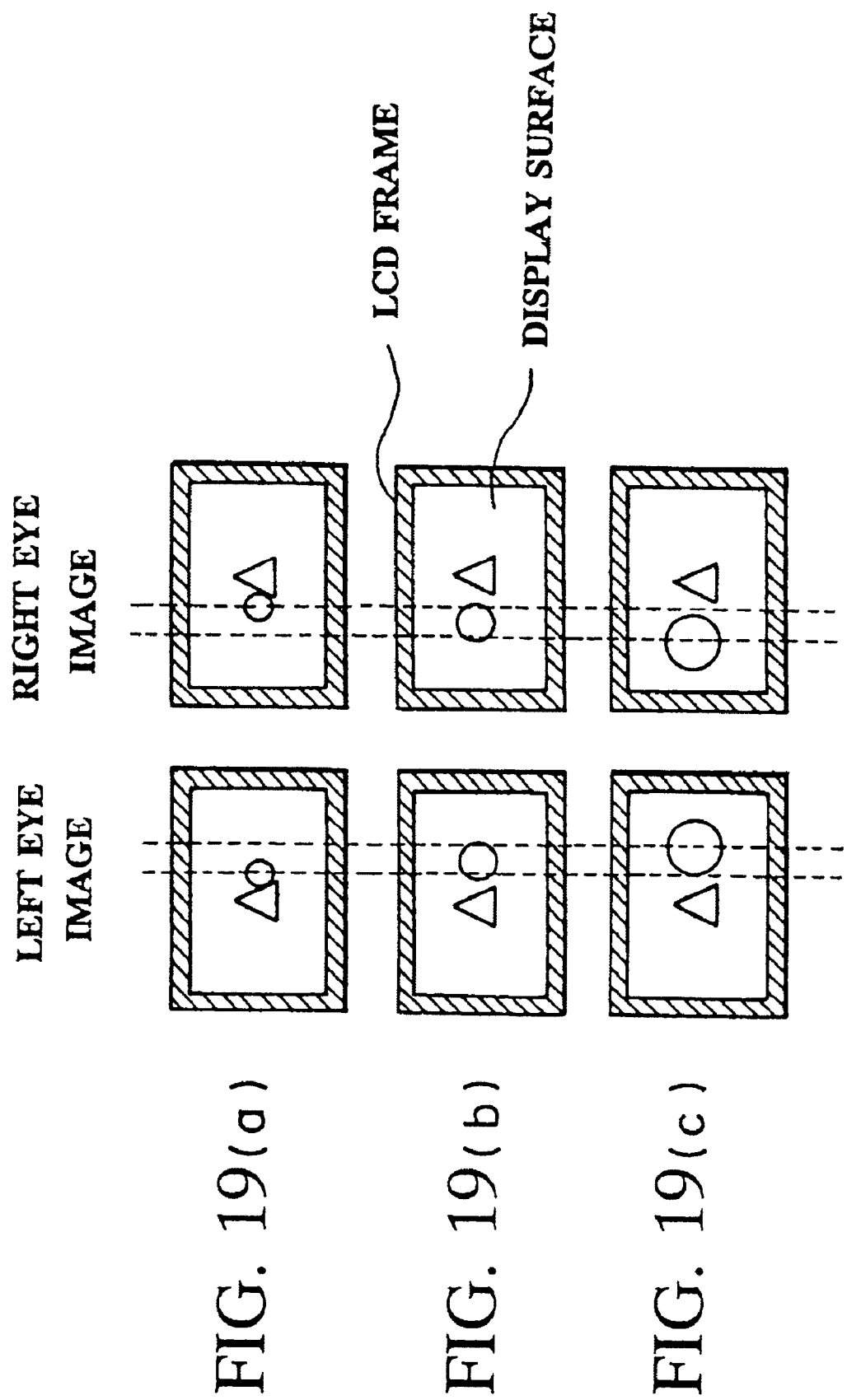
FIGS. 19(*a*) to 19(*c*) are views for describing how left eye and right eye images are viewed as stereo image in the stereo image display apparatus.
Figure 20:
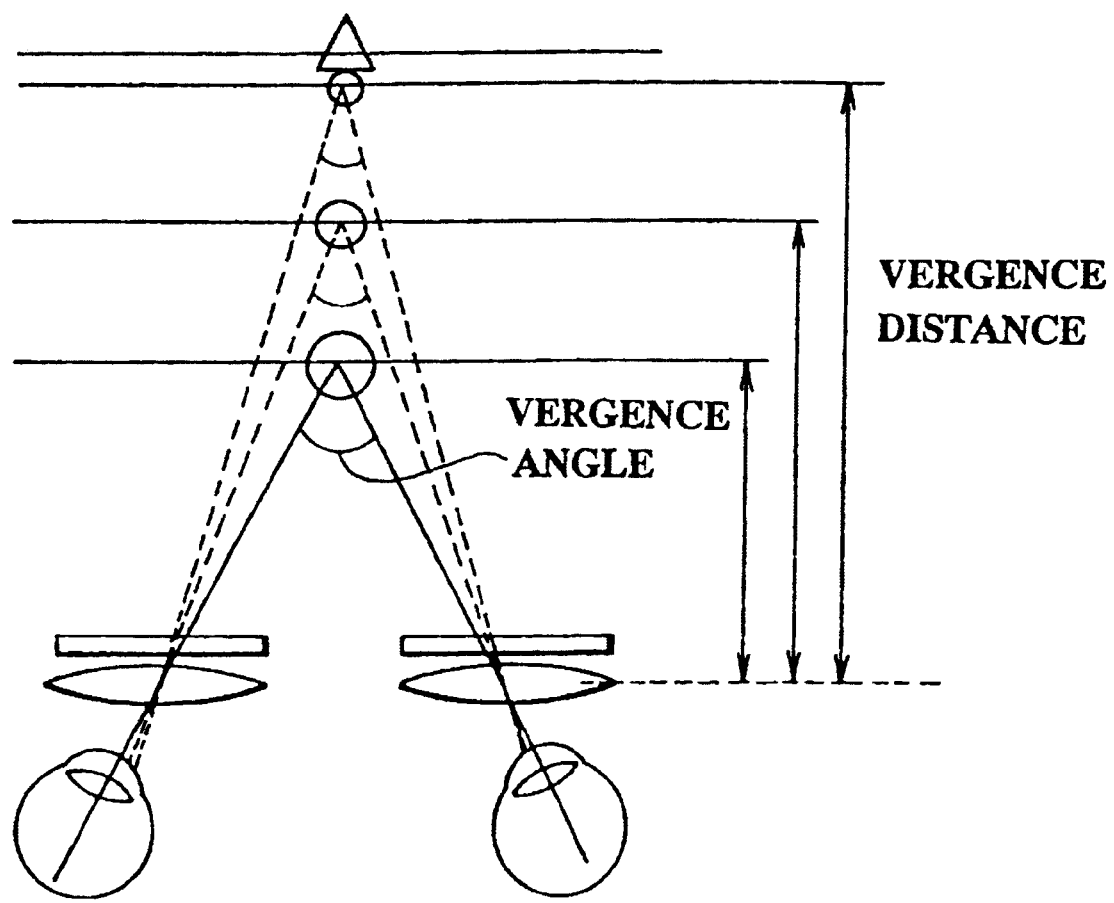
FIG. 20 shows the way in which the images shown in FIGS. 19(*a*) to 19(*c*) are viewed with the two eyes.
Figure 21:
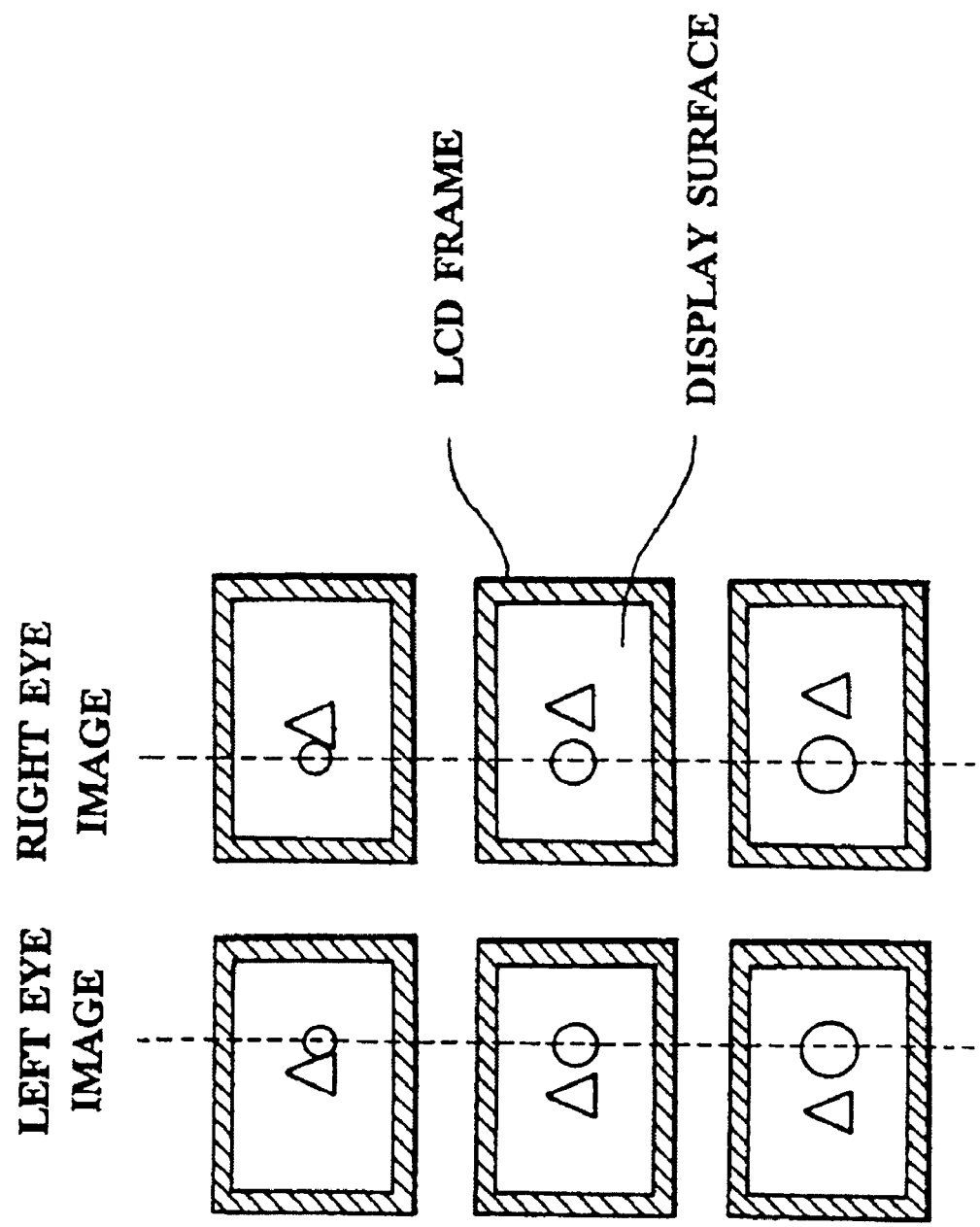
FIGS. 21(*a*) to 21(*c*) are views showing left eye and right eye images displayed in a stereo image display apparatus, which was proposed earlier by the inventor.
Figure 22:
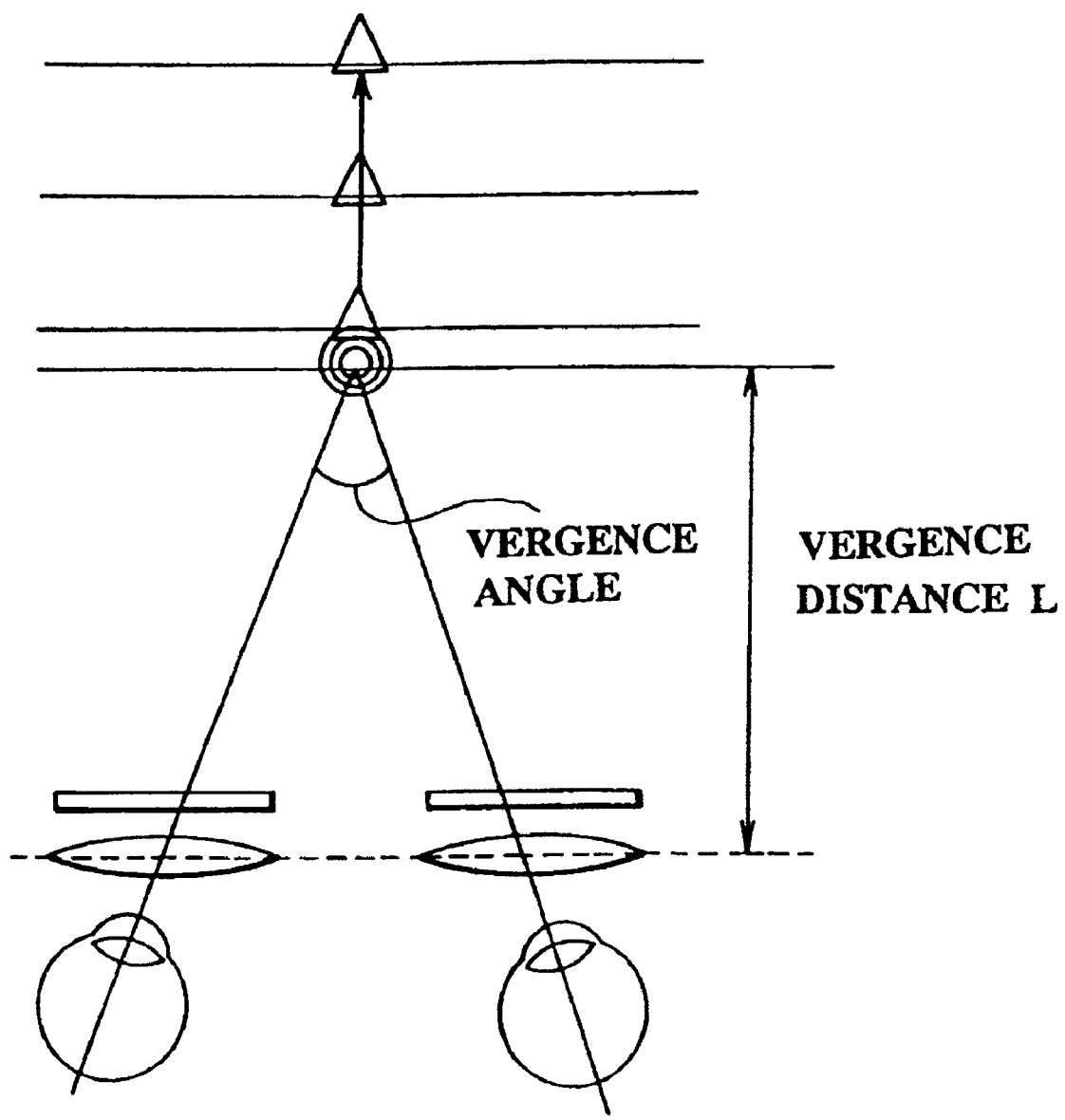
FIG. 22 shows the three-dimensional space made by an HMD when the images of FIG. 21(*a*) to 21(*c*) are displayed on the HMD.
Figure 23:
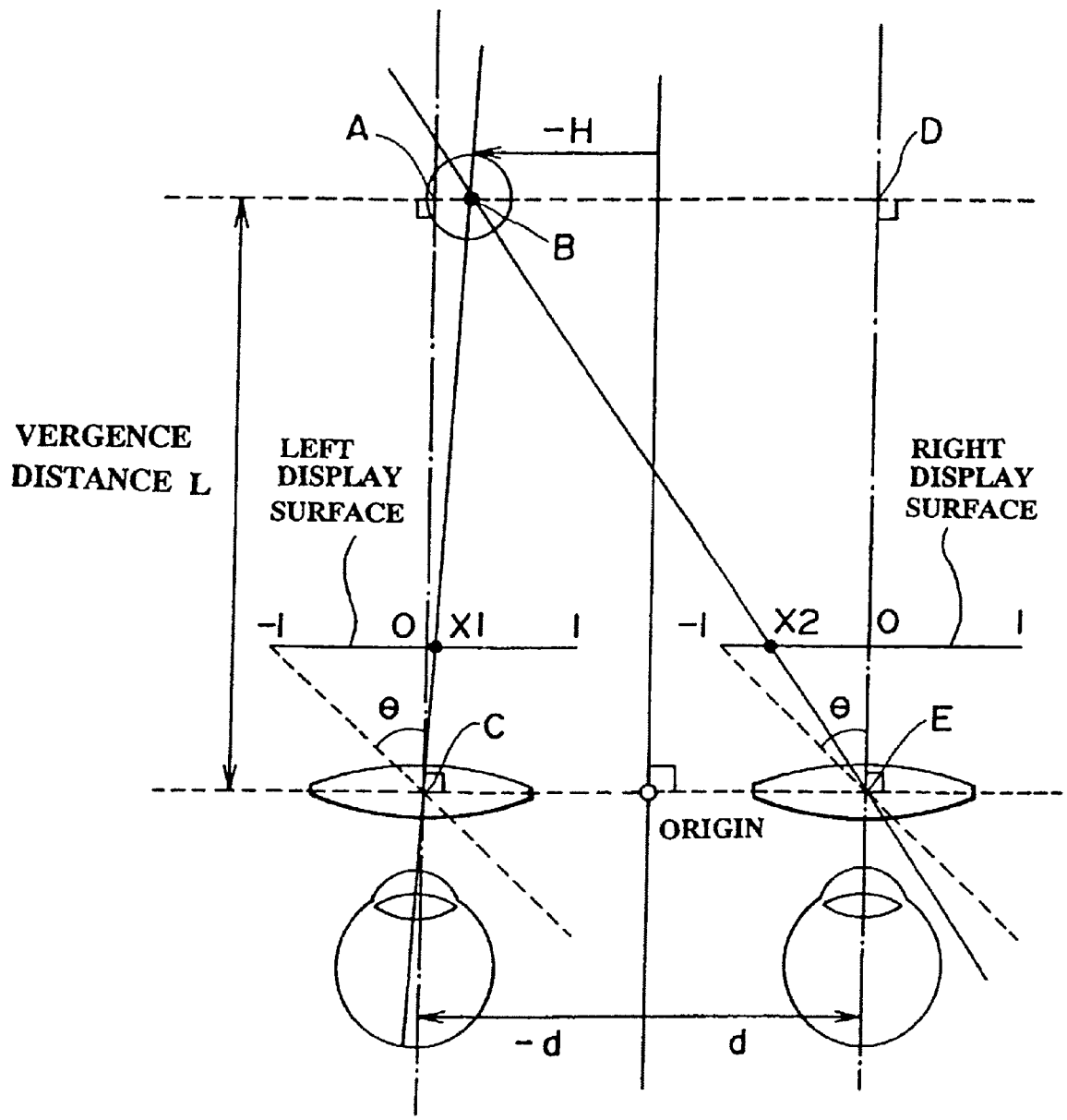
FIG. 23 is a view for explaining the status of merging of a stereo image, which is actually displayed on a left and a right display surface.
Figure 24:
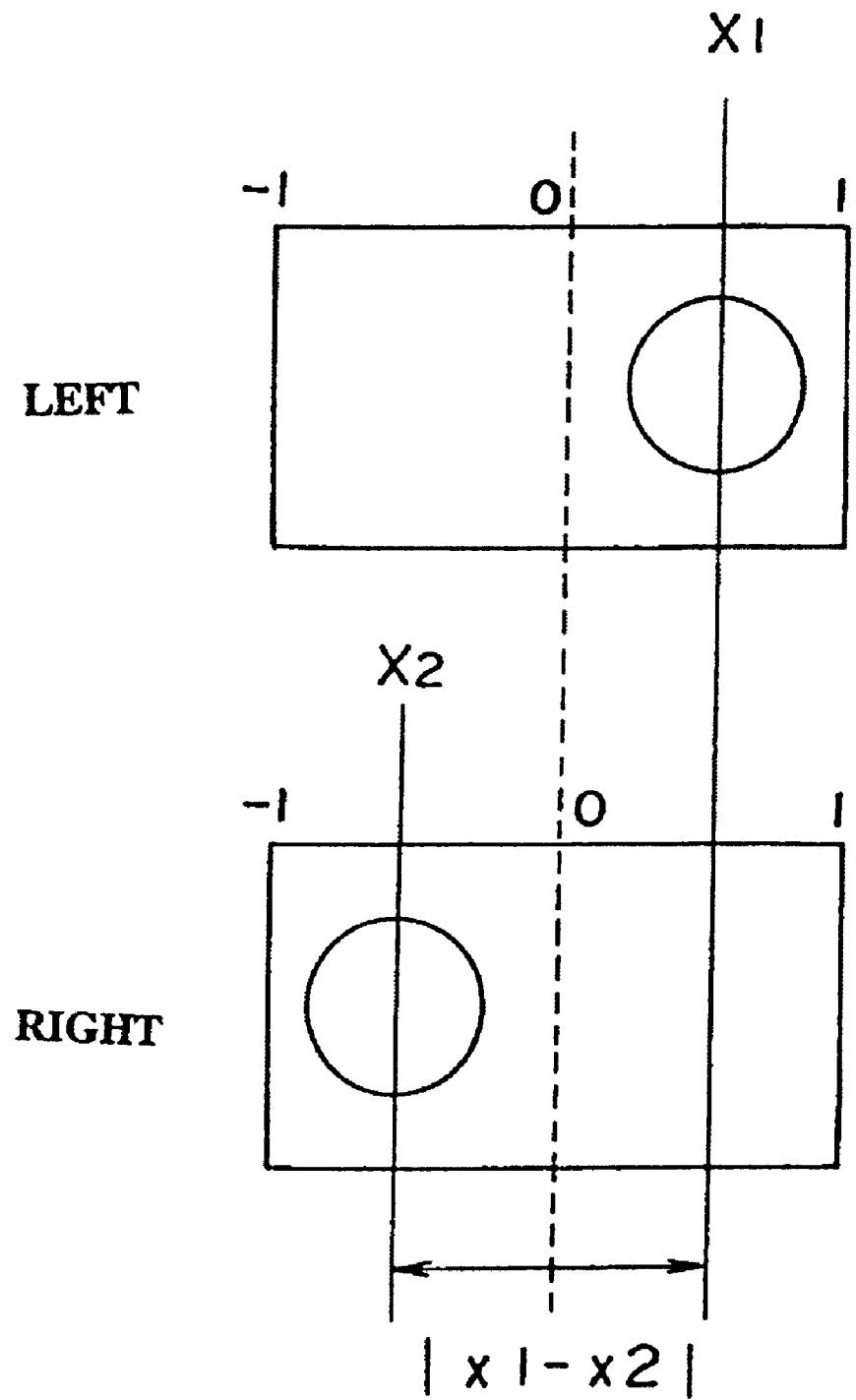
FIG. 24 is a view showing how the horizontal positions $X_1$ and $X_2$ in FIG. 23 are prescribed.
Figure 25:
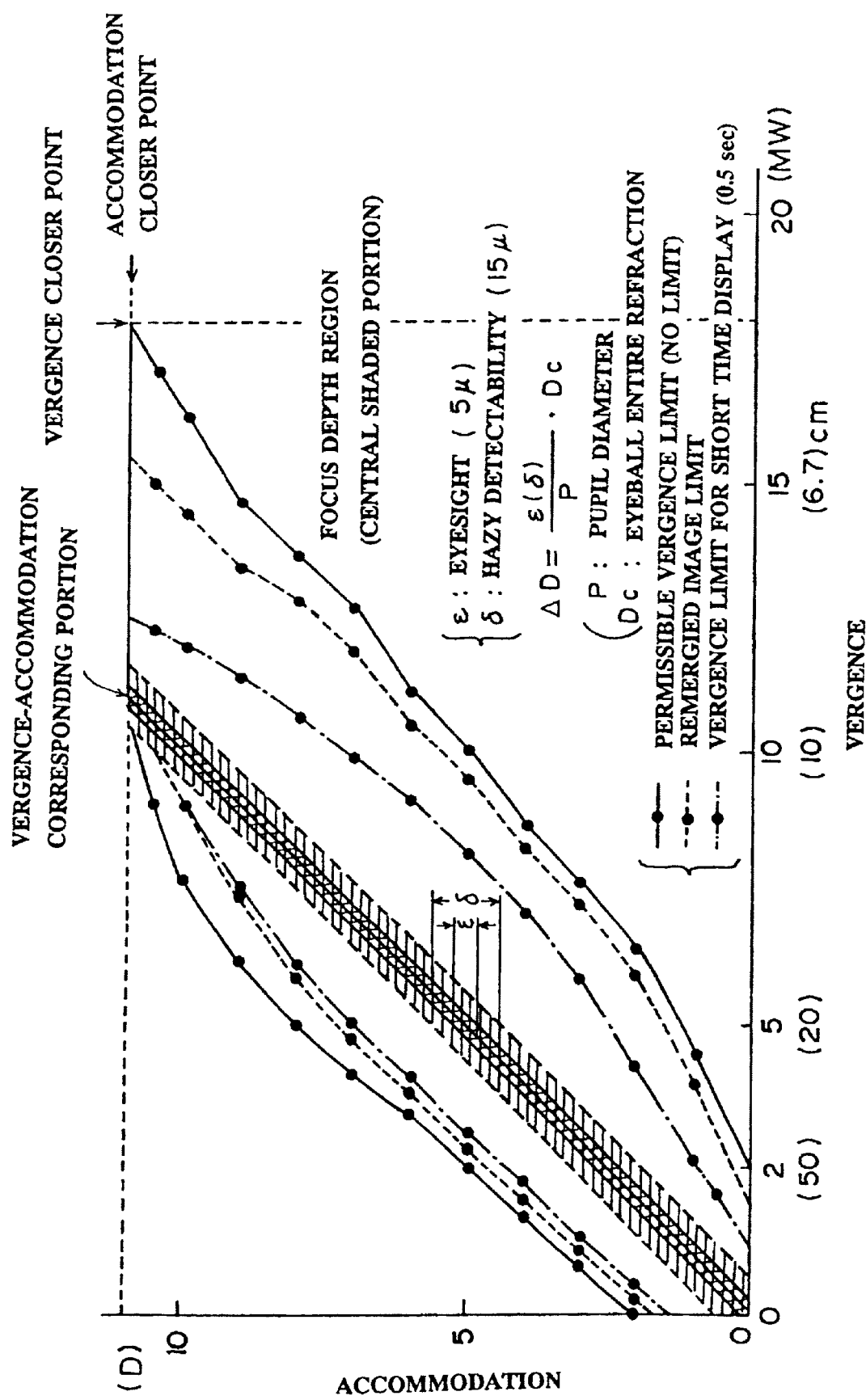
FIG. 25 is a graph representing a relationship between the vergence and the accommodation.

FIG. 16 is a block diagram showing a further embodiment of the present invention, which comprises a stereo image generator which is entirely the same as the stereo image generator 100 shown in FIG. 13 and an associated stereo image processor. FIG. 16 particularly shows the stereo image processor 200'.

In the construction shown in FIG. 16, many parts are like those shown in FIG. 14, and like parts are designated by like reference numerals, while omitting their detailed description. The difference of the construction shown in FIG. 16 from the construction shown in FIG. 14 resides in that while the parallax difference deriving circuit 209 derived a corrected value concerning the right eye image, a parallax difference deriving circuit 209' in the construction shown in FIG. 14 generates correction signals concerning the right eye and left eye images, and supplies the right eye image correction signal to the control signal input terminal of the parallax distribution signal controller 220, while supplying the left eye image correction signal to a horizontal shifter 222, which shifts the horizontal display position of image of the left eye image signal 211 obtained as a result of expansion of the left eye image signal in the left eye image signal expander 206. The circuit 209' adequately effects such control as the correction (or horizontal display position shift) of the right eye and left eye images according to respective correction signals; for example, it is adapted to add or subtract one half of each of the right eye and left eye images.

With the stereo image display apparatus according to the present invention comprising the construction shown in FIG. 16 as the stereo image processor, both the right eye and left eye images can be adequately corrected, so that it is possible to avoid undesired changes in the horizontal display position of the corrected images viewed as stereo image.

It is possible in the construction shown in FIG. 16 to invert (or interchange) the roles of the left eye and right eye image systems.

FIGS. 17(a)–(c) are schematic views for explaining the operation of the embodiment of the present invention constructed by various parts shown in FIGS. 13 and 16. A parallax distribution signal representing the position distribution of parallax (i.e., parallax map) concerning the left eye image display surface, is generated on the basis of right eye and left eye images of the triangular pyramid and the sphere. As described before, the parallax distribution signal (representing the parallax map) and the left eye image signal are compressed and transmitted from the stereo image generator 100 to the stereo image processor 200. The parallax distribution signal has an image signal level corresponding to the magnitude of the parallax, for instance. Like the case of FIG. 15, the brightness of the image of the sphere, for which the parallax is high, is high, while the brightness of the image of the triangular pyramid, for which the parallax is low, is low.

In the stereo image processor 200', a difference signal (A–B), which is the difference between the received and expanded (i.e., restored) parallax distribution signal B and the signal A representing the desired parallax, is derived. According to this difference (A–B), the parallax distribution signal is corrected such that it is increased or reduced by an equal amount with respect to the parallax levels on the entire parallax map. In the illustrated example, the parallax levels of a substantially central horizontal line on the display surface, including the parallax level of the triangular pyramid representing a relatively low hill and the parallax level of the sphere representing a relatively high level, are entirely reduced by an equal amount, i.e., one half the above parallax, through the level control. In other words, the parallax of the parallax Map is corrected such that it is reduced over the entire display surface.

A right eye image signal with corrected parallax is reconstructed in dependence on the left eye image signal obtained as a result of the expansion of the left eye compressed image signal and parallax of the corrected parallax map. In this embodiment, the left eye image is corrected by shifting its horizontal display position by one half the above parallax. Thus, in this embodiment it is possible to avoid undesired shift of the horizontal display position of the reproduced images for the parallax correction.

While various embodiments of the present invention have been described in the foregoing, it is possible to arrange such as to obtain data (or signals) for obtaining right eye and left eye images within the apparatus and externally connect display means for obtaining display capable of being viewed according to these data (or signals).

Binocular parallax control which sufficiently reflects the actual accommodation or vergence of the viewer's eyes at the viewing point can be obtained, and it is possible to realize a stereo image display apparatus with further reduced calculation time, cost and data transmission capacity.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A stereo image display apparatus comprising:

parallax distribution data generating means for generating parallax distribution data representing a parallax distribution status viewed in relation to one of left eye and right eye images having a binocular parallax at each predetermined position in the other eye display region;

transmitting means for transmitting only the other eye image data from among one eye and other eye image data representing one eye and other eye images and the parallax distribution data;

receiving means for receiving the other eye data and the parallax distribution data transmitted by the transmitting means;

desired parallax data holding means for holding predetermined desired parallax data;

parallax difference data deriving means for extracting data representing a parallax in particular coordinates among the parallax distribution data received by receiving means and deriving data representing the difference between the extracted parallax data and the desired parallax data held in the desired parallax data holding means; and parallax distribution data correcting means for correcting the entire parallax distribution data received by the receiving means by an equal amount according to the difference data from the parallax difference data deriving means.

2. The stereo image display apparatus according to claim 1, which further comprises data compressing means for compressing the first eye image and the parallax distribution data before transmission, and data expanding means for expanding the compressed first eye image and parallax distribution data after transmission.

3. A stereo image display apparatus, comprising:

a parallax distribution data generating unit constructed and arranged to generate parallax distribution data representing a parallax distribution status viewed in relation to a first image in relation to a second image;

a transmitter in communication with said parallax distribution data generating unit, said transmitter transmitting image data representing said first image and said parallax distribution data;

a receiver in communication with said transmitter, said receiver receiving said first image data and said parallax distribution data transmitted by said transmitter;

a desired parallax data holding unit constructed and arranged to hold predetermined desired parallax data;

a parallax difference data deriving unit constructed and arranged to extract data representing a parallax in particular coordinates among the parallax distribution data received by the receiver and deriving data representing a difference between the extracted parallax data and the desired parallax data held in the desired parallax data holding unit;

a parallax distribution data correcting unit constructed and arranged to correct the entire parallax distribution data by an equal amount according to the difference data from the parallax difference data deriving unit; and an image data generating unit constructed and arranged to generate second corrected image data representing the second image according to the first image data received by the receiver and the corrected parallax distribution data from the parallax distribution data correcting unit, and supplying the received first image data and the second corrected image data to a predetermined display unit.

4. A stereo image display apparatus according to claim 3, further comprising a data compressing unit constructed and arranged to compress the first image and the parallax distribution data before transmission, and a data expanding unit constructed and arranged to expand the compressed first image and parallax distribution data after transmission.

5. A stereo image display apparatus, comprising:

a parallax distribution data generating unit constructed and arranged to generate parallax distribution data representing a parallax distribution status viewed in relation to one of first and second images having a binocular parallax at each predetermined position in the other image display region;

a transmitter constructed and arranged to transmit only the other image data from among one of first and second image data representing first and second images and the parallax distribution data;

a receiver constructed and arranged to receive the other image data and the parallax distribution data transmitted by the transmitter;

a desired parallax data holding unit constructed and arranged to hold predetermined desired parallax data;

a parallax difference data deriving unit constructed and arranged to extract data representing a parallax in particular coordinates among the parallax distribution data received by said receiver and deriving data representing the difference between the extracted parallax data and the desired parallax data held in the desired parallax data holding unit; and parallax distribution data correcting unit constructed and arranged to correct the entire parallax distribution data received by the receiver by an equal amount according to the difference data from the parallax difference data deriving unit.

* * * * *